United States Patent
Kawasaki et al.

(10) Patent No.: US 7,031,832 B2
(45) Date of Patent: Apr. 18, 2006

(54) INFORMATION PRESENTATION APPARATUS AND INFORMATION PRESENTATION METHOD

(75) Inventors: Yoshiteru Kawasaki, Toyonaka (JP); Kenji Nishimura, Nabari (JP); Hitoshi Araki, Hirakata (JP); Keiichi Senda, Kyoto (JP); Masato Yuda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 52 days.

(21) Appl. No.: 10/795,437

(22) Filed: Mar. 9, 2004

(65) Prior Publication Data
US 2004/0181337 A1    Sep. 16, 2004

(30) Foreign Application Priority Data
Mar. 10, 2003 (JP) ............................. 2003-063654

(51) Int. Cl.
*G01C 21/34* (2006.01)
(52) U.S. Cl. .................. 701/210; 701/204; 340/995.19
(58) Field of Classification Search ................ 701/209, 701/210, 211, 201, 204; 340/995.19, 995.23
See application file for complete search history.

(56) References Cited

U.S. PATENT DOCUMENTS

| | | | |
|---|---|---|---|
| 6,178,378 B1 | | 1/2001 | Leibold |
| 6,542,812 B1 * | 4/2003 | Obradovich et al. ........ 701/207 |
| 6,678,613 B1 * | 1/2004 | Andrews et al. ............ 701/213 |
| 6,701,248 B1 * | 3/2004 | Petzold et al. .............. 701/202 |
| 6,778,905 B1 * | 8/2004 | Horikami ..................... 701/213 |
| 2002/0082771 A1 * | 6/2002 | Anderson .................... 701/209 |

FOREIGN PATENT DOCUMENTS

| EP | 0 660 083 | 6/1995 |
|---|---|---|
| EP | 0 933 746 | 8/1999 |
| JP | 9-101162 | 4/1997 |
| JP | 2001-21375 | 1/2001 |
| WO | 01/88480 | 11/2001 |

\* cited by examiner

*Primary Examiner*—Michael J. Zanelli
(74) *Attorney, Agent, or Firm*—Wenderoth, Lind & Ponack, L.L.P.

(57) ABSTRACT

An in-vehicle information apparatus presents, to a user, information which includes a returning route. The apparatus includes: a home position holding unit for holding beforehand a position of the user's home; a home arrival time holding unit for holding beforehand the user's home arrival time; a present position obtainment unit for obtaining the user's present position; a present time obtainment unit for obtaining a present time; a route search unit for obtaining a returning route from the present position to the user's home position, a required time for the returning route, and a departure time to leave the present position so the user can get home by the home arrival time; and a presentation unit for comparing the obtained departure time and the present time, and presenting to the user the departure time and the returning route obtained by the route search unit, before the departure time is passed.

16 Claims, 24 Drawing Sheets

FIG. 7

Set home position

71 ☐ Map
72 ☐ Telephone number
    [_____] 72a
73 ☐ Address
    [_____] 73a
74 ☐ Coordinate
Latitude  [_____] 74a
Longitude [_____] 74b

FIG. 8

Set home arrival time

Home arrival time table 183b

| Hiromi (father) | Usagi (mother) | Momo (daughter) |
|---|---|---|
| 23:00 | Monday 14:00<br>Wednesday 16:00<br>Thursday 13:00<br>Other days 18:00 | 21:30 |

FIG. 17

Route selection preference table 184b

| | Hiromi (father) | Usagi (mother) | Momo (daughter) |
|---|---|---|---|
| Prioritize the use of toll roads? | Yes | No | No |
| Prioritize the use of roads with few intersections? | No | Yes | Yes |
| Prioritize the use of large roads? | No | No | No |
| ... | ... | ... | ... |

FIG. 18
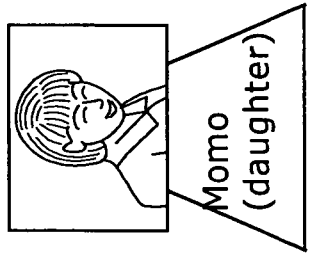
Momo (daughter)
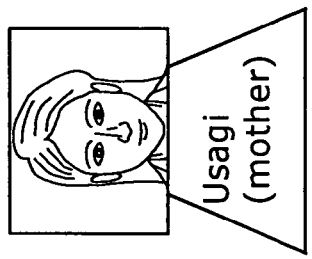
Usagi (mother)
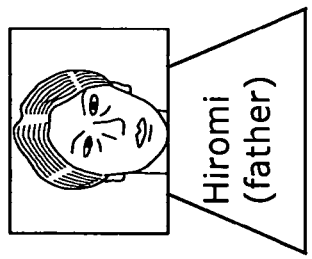
Hiromi (father)
Set a driver
Set a driver of the vehicle.
Please touch a driver icon.

FIG. 21

| | | Momo (daughter) |
|---|---|---|
| 182 | Home position | ...Momoyamadai, Suita-City |
| 183 | Home arrival time | 21:30 |
| 184b — Route selection preference | Order of priority in means of transportation | train | 1 |
| | | bus | 2 |
| | | taxi | 3 |
| | | on foot | 4 |
| | Prioritize a total amount of fares? | Yes |
| | Order of priority for walking routes | Avoid dark places | 1 |
| | | Take shortest route | 2 |
| | | ... | ... |

Panahoo! Map information

Top>

Search train lines around Osaka area.

Please select the nearest station.

Panahoo! Map information
Top> Area map around Nishinakajima 3, Yodogawa,
 Osaka-City, Osaka Switching of scales:1/3000 1/8000 1/21000 1/75000 1/150000 1/300000 1/900000
 Regional National

INFORMATION PRESENTATION APPARATUS AND INFORMATION PRESENTATION METHOD

BACKGROUND OF THE INVENTION (1) Field of the Invention

The present invention relates to an information presentation apparatus such as an in-vehicle information apparatus for presenting information to a driver, and a method of presenting the information.

(2) Description of the Related Art

Recently, with the wide use of a vehicle among family users (e.g., mothers and children), it has become common to equip the vehicle with an in-vehicle information apparatus (e.g., a car navigation apparatus) for assisting the family users.

When the user inputs a certain destination before heading for the destination by car, the conventional in-vehicle information apparatus searches for a route which requires the shortest amount of time to drive from a present position to a destination on an hourly basis and presents the searched route and the required time to the user (see, for example, Japanese Laid-Open Patent Application No. 9-101162 (FIG. 1 in the first page)).

Some conventional in-vehicle information apparatuses set a price ceiling per unit of distance that is allowed by the user as well as a destination, and search automatically for a route that includes a toll road within the range of the price ceiling in order to present a route from a present position to a destination, which reflects the user's preference for toll roads (see, for example, Japanese Laid-Open Patent Application No. 2001-21375 (FIG. 8 in the first page)).

However, the conventional in-vehicle information apparatus is rather cumbersome since the family user whose destination is mostly his/her home has to input the destination (i.e., home) each time he/she returns home.

In most cases, the family user has a fixed time to return home, for instance, in order to get back by curfew or in order to be on time for preparing dinner. Some family users desire that one's preferences should be reflected in a selection for the route to return home. The preferences can be, for example, avoiding toll roads (not to spend money) or driving a car in a relaxed manner (taking a route with few intersections and taking a large route).

However, the conventional in-vehicle information apparatus has considered only the case of moving from the present position to the destination that varies each time the user drives, and has not been able to search for a route or calculate the required time, focusing on the case of returning home from a certain place. That is to say, the user usually goes out hoping "I would like to come home at such time at the latest" and for most of the cases, the time to come home is almost the same wherever he/she may go. Under such circumstances, the conventional in-vehicle information apparatus requires operations to set the destination as home and to calculate back the departure time based on the required time presented by the apparatus in order to inform the user of a departure time to leave the place so that the user can reach home at a desired time. This, however, generates a sense of discomfort in the user's mind since the user has to repeat the same operation each time he/she goes out.

Considering a case in which the departure time is delayed due to a longer stay in the place where the user has gone, the user's preferences in selecting a route may change, e.g., the user may desire to take a toll road with the view to come home by time although he/she does not usually take the toll road. Under such circumstances, the conventional in-vehicle information apparatus requires an operation to request a search for the route based on different preferences. This also generates an annoyance in the user's mind because of the cumbersome operation.

Such problems as described above are found not only in the in-vehicle information apparatuses, but in the information presentation apparatuses in general for presenting a returning route to the user.

SUMMARY OF THE INVENTION

An object of the present invention conceived in light of such conventional problems is to provide an information presentation apparatus and an information presentation method for presenting to the user the information on the departure time to leave a place so that the user can return home at the desired time wherever he/she may be, without cumbersome operations, and searching for a route by automatically varying the proportion of reflecting the user's preferences when it is judged that the user cannot get home in time with the user's preferences set by the user.

Namely, the first object of the present invention is to provide the information presentation apparatus as well as the information presentation method, with improved operational performance for searching for a route with which the user can return home at the desired time.

The second object of the present invention is to provide the information presentation apparatus as well as the information presentation method for searching for a route to home which reflects the user's preferences as much as possible.

In order to achieve the first object, the information presentation apparatus according to the present invention for presenting, to a user, information which includes a returning route, comprises: a home position holding unit operable to hold in advance a position of the user's home; a home arrival time holding unit operable to hold in advance a home arrival time of the user; a present position obtainment unit operable to obtain a present position of the user; a present time obtainment unit operable to obtain a present time; an obtainment unit operable to obtain information of a returning route from the present position to the user's home position, a required time for the returning route, and a departure time to leave the present position so that the user can get home by the home arrival time; and a presentation unit operable to compare the departure time obtained by the obtainment unit and the present time, and present to the user the departure time and the returning route which are obtained by the obtainment unit, before the departure time is passed.

Thus, the information presentation apparatus of the present invention automatically selects the route to home within a range in which the user can get home by the desired time, and informs the user of the departure time by which to leave the place so that the user can get home by the desired time without minding the time.

In order to achieve the second object, the information presentation apparatus according to the present invention further comprises a preference accumulation unit operable to accumulate beforehand user's preferences relating to route selection, wherein the obtainment unit obtains the returning route which reflects the user's preferences relating to route selection, which are accumulated by the preference accumulation unit.

Thus, the user can take the route which reflects his/her preferences at maximum and get home by the desired time.

The information presentation apparatus according to the present invention may further comprise a map data holding unit operable to hold map data, wherein the information presentation apparatus is placed in a vehicle the user drives, and the obtainment unit obtains the returning route, the required time for the returning route, and the departure time based on the map data, and the presentation unit presents on a map the returning route to be taken by the user.

Thus, the user can drive without getting lost in an unfamiliar place.

The information presentation apparatus according to the present invention may further comprise an operation unit, wherein the obtainment unit searches for the returning route when the user operates the operation unit. The obtainment unit may search for the returning route in at least one of the following dynamic timings: at intervals of a predetermined period of time; at intervals of a predetermined amount of distance; when the vehicle stops at a traffic light; when new VICS information including new traffic information is obtained; and when the user's vehicle drives off the guide route.

Thus, the user can search for a route and search for it again in an appropriate timing so as to obtain an optimal route to home.

The user's preferences relating to route selection which are accumulated by the preference accumulation unit may include at least one of the following: "Prioritize toll roads", "Prioritize large roads", and "Prioritize roads with few intersections". The information presentation apparatus according to the present invention may further comprise a control unit operable to control a degree of reflecting the user's preferences relating to route selection which are used by the obtainment unit, wherein the control unit may compare the present time, the home arrival time, and the required time for the returning route obtained by the obtainment unit, and judge whether or not the user can get home by the home arrival time by taking the returning route obtained by the obtainment unit. When judging that the user cannot get home by the home arrival time, the control unit may request the obtainment unit to search for the route again based on modified preferences of the user relating to route selection so as to shorten the required time.

Thus, the range of selecting the route to home is widened so that the user can get home by the desired time.

The presentation unit may present to the user that the user's preferences relating to route selection, which are already set by the user, are modified, in the case where the control unit has requested the obtainment unit to modify the preferences relating to route selection so as to search for the route again.

Thus, the user is informed that the preferences are modified in the route search.

In the case where the control unit has requested the obtainment unit to modify the user's preferences relating to route selection so as to search for the route again, the control unit may update the preferences relating to route selection, which are accumulated by the preference accumulation unit, to the modified preferences.

Thus, the option for selecting the route to home is widened.

The information presentation apparatus may further comprise a user specification unit operable to specify a user from among a plurality of users, wherein the home arrival time holding unit holds in advance a home arrival time for each of the plurality of users, the preference accumulation unit holds in advance preferences relating to route selection for each of the plurality of users, and the obtainment unit obtains a returning route which reflects the user's preferences relating to route selection, where the user is specified by the user specification unit.

Thus, even in a case where plural persons drive a car, the route to home is selected automatically within a range in which the user can get home by the desired time, with simple operations, taking the route which reflects the user's preferences, without minding the time since the user is informed of the departure time to leave the place.

The information presentation apparatus may further comprise a user identification unit operable to identify a user from among a plurality of users, wherein the home arrival time holding unit holds in advance a home arrival time for each of the plurality of users, the preference accumulation unit accumulates in advance preferences relating to route selection for each of the plurality of users, and the obtainment unit obtains a returning route which reflects the user's preferences relating to route selection, where the user is identified by the user identification unit.

Thus, even in the case where plural persons drive a car, the route to home is selected automatically within a range in which the user can get home by the desired time, without operations, taking the route which reflects the user's preferences, without minding the time since the user is informed of the departure time to leave the place.

It should be noted that the present invention can be realized not only as an information presentation apparatus such as the one described above but also as a portable information presentation apparatus and also as the information presentation method having the characteristic units included in such information presentation apparatus as steps, and even as a program causing a computer to execute these steps. Needless to say, such a program can surely be distributed via a storage medium such as a CD-ROM or a transmission medium like Internet, or the like.

As is apparent from the above description, the information presentation apparatus according to the present invention automatically selects the route reflecting the user's preferences within the range which allows the user to come home at the desired time without delay, and informs the user of the departure time by which to leave the place. Thus, the user can come home by the desired time, taking the route reflecting the user's preferences at maximum, without minding the time.

For further information about the technical background to this application, Japanese Patent Application No. 2003-063654, filed on Mar. 10, 2003, is incorporated herein by reference.

BRIEF DESCRIPTION OF THE DRAWINGS

These and other objects, advantages and features of the present invention will become more apparent from the following description when taken in conjunction with the accompanying drawings which illustrate specific embodiments of the present invention. In the Drawings:

FIG. 7 shows an example of the screen to set a position of a user's home;

FIG. 8 shows an example of the screen to set a home arrival time;

FIG. 16 is a structural example for a table of home arrival times;

FIG. 17 shows a structural example for a table of route selection preferences;

FIG. 18 shows a structural example of a screen to set a driver;

FIG. 21 shows a structural example of a table for storing a position of a user's home, a desired home arrival time and route selection preferences;

FIGS. 24A–24F show an example of the screen to select a candidate as well as detailed examples of each selected candidate to be displayed by a display 130 of the cell phone 60: FIG. 24A shows the screen to select a candidate, and FIGS. 24B–24F respectively show the screen to display in detail each of the selected candidates;

DETAILED DESCRIPTION OF THE PREFERRED EMBODIMENTS

The following is a detailed description of the embodiments of the present invention with reference to the drawings.

First Embodiment

Figure 1:
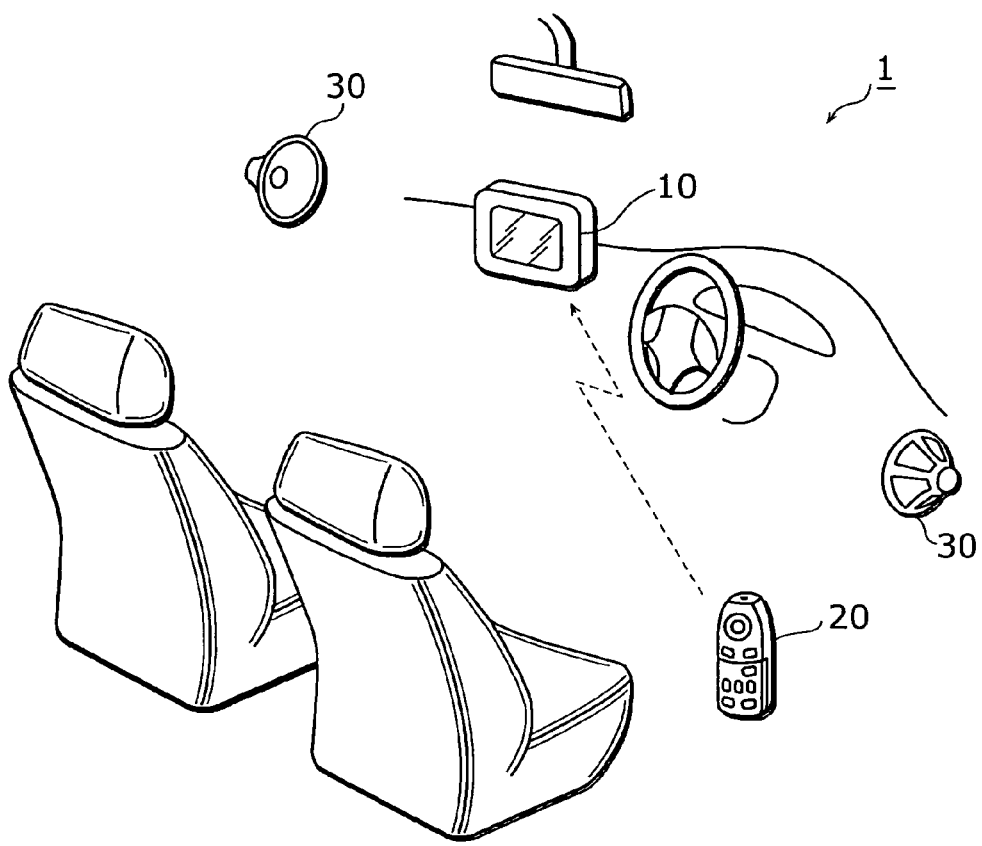
FIG. 1 shows a whole configuration in the case of applying the information presentation apparatus according to the first embodiment of the present invention to an in-vehicle information apparatus (e.g., a car navigation apparatus)

FIG. 1 shows a whole configuration in the case of applying the information presentation apparatus according to the first embodiment of the present invention to an in-vehicle information apparatus (e.g., a car navigation apparatus).

As can be seen in FIG. 1, the in-vehicle information apparatus 1 includes an in-vehicle information apparatus as a main body 10, a remote controller 20 and plural (two in FIG. 1) speakers 30 and others.

The in-vehicle information apparatus as a main body 10 is an apparatus to assist a driver (user), and displays route information in a form of combining a present position of the vehicle which varies as the time passes, map data, a route to home or a time to get home (i.e., home arrival time), according to the information received from the remote controller 20. It should be noted that the in-vehicle information as a main body 10 receives broadcast data for TV so as to replay video or receives traffic information via FM broadcast as well as a beacon so as to inform the driver of a secret path in order to avoid traffic congestion.

The remote controller 20, which is composed of an infrared sending module, plural manual operation buttons and others, receives an input from the driver (user) through an operation of the manual operation buttons, and sends the information based on the operation to the in-vehicle information apparatus as a main body 10 by means of infrared radiation.

The speaker 30 replays voice (audible reproductions) for navigation information and TV audio.

Figure 2:
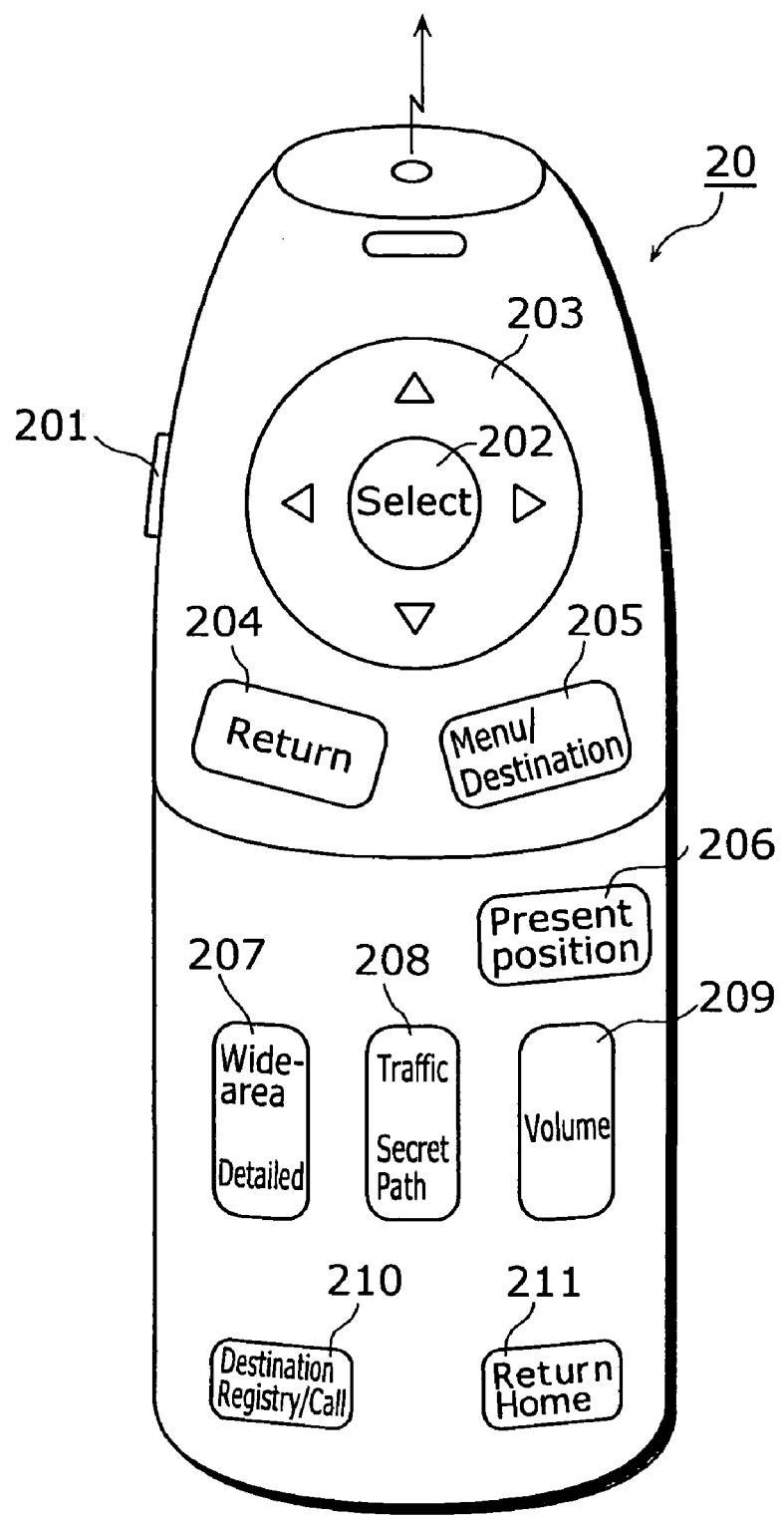
FIG. 2 shows a structural example of the operational buttons set in the remote controller 20.

FIG. 2 shows a structural example of the manual operation buttons set in the remote controller 20 shown in FIG. 1.

The following buttons are set on the casing surface of the remote controller 20: a switching button 201 for switching between a navigation mode and a replay mode; a Select button 202 for deciding an input or the like; a cursor shifting button 203 for shifting a cursor; a Return button 204 for returning to the previous screen; a Menu/Destination button 205 for displaying various kinds of menus and registered destinations; a Present Position button 206 for displaying the present position and giving an audio guidance for an expected time of arriving at the next intersection or at the destination; a Wide-area/Detailed button 207 for displaying a wide-area map by increasing the magnification of the map as well as a detailed map by decreasing the magnification of the map; a Traffic/Secret Path button 208 for displaying or audio guiding the traffic and displaying a secret path in order to avoid the traffic when traffic congestion is generated; a Volume button 209 for setting the volume of the speaker 30; a Destination Registry/Call button 210 for registering the destination and calling the registered destination; and a Return Home button 211 to be operated when going home or the like. By using these buttons 201–211, the user can input instructions for a desired navigation.

It should be noted that the lower part of the casing has an openable and closable cover on the surface, under which ten keys for selecting a TV channel and other keys are set.

Figure 3:
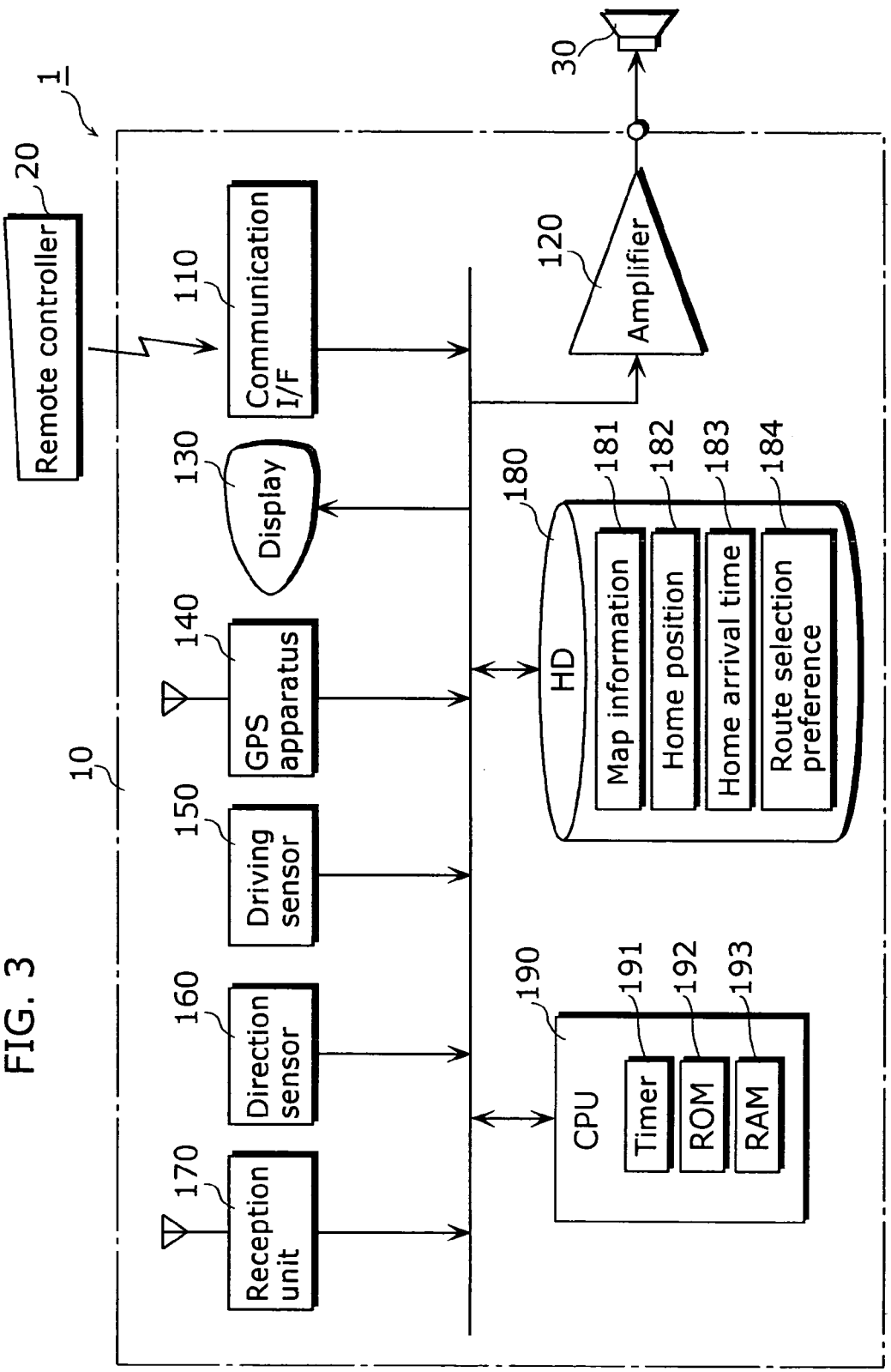
FIG. 3 shows a hardware configuration of the in-vehicle information apparatus as a main body 10 shown in FIG. 1.

FIG. 3 shows the hardware configuration of the in-vehicle information apparatus as a main body 10 shown in FIG. 1. It should be noted that the remote controller 20 and the speaker 30 are shown in FIG. 3 as well.

The in-vehicle information apparatus as a main body 10 includes a communication interface (I/F) 110, an amplifier 120, a display 130, a Global Positioning System (GPS) apparatus 140, a driving sensor 150, a direction sensor 160, a reception unit 170, a hard disk (HD) 180, a Central Processing Unit (CPU) 190, and others.

The communication interface 110 receives information from the remote controller 20.

The amplifier 120 outputs audio signals to the speaker 30.

The display 130, which is composed of LCD and the like, displays TV images and the image information related to the navigation.

The GPS apparatus 140 obtains the present position of the vehicle from the satellite by using electric waves.

The driving sensor 150 detects a speed and a driving distance of the vehicle.

The direction sensor 160 detects a direction in which the vehicle is traveling based on the angle of the steering wheel.

It should be noted that the driving sensor 150 and the direction sensor 160 are not always connected to the CPU 190 and may be connected indirectly via a certain apparatus (in-vehicle information terminal apparatus) or the like, as is the case for the in-vehicle sensor that is already set in the vehicle beforehand.

The reception unit 170 receives in real-time the electric waves for TV broadcasting, the waves and beacons for road information such as traffic, a traffic accident, construction, vacancies in a parking area and other information in the Vehicle Information and Communication System (VICS).

The HD 180 stores map information 181 as well as a home position 182, a home arrival time 183, a route selection preference 184 and others which are inputted by the user operating the remote controller apparatus 20.

The CPU 190 is a one-chip computer which internally incorporates the following: a timer 191 for measuring time; a Read Only Memory (ROM) 192 in which an OS (operating system) is already stored for multi-task processing the programs such as a program for TV reception only, a normal program for the in-vehicle information apparatus, and a dedicated program for returning home with the use of the in-vehicle information apparatus; and a Random Access Memory (RAM) for providing a work area in order to expand these programs for execution. The CPU 190 controls integrally each of the units 110–180 by executing the program expanded on the RAM 193, and performs the smooth operations for replay on TV and route guidance.

Figure 4:
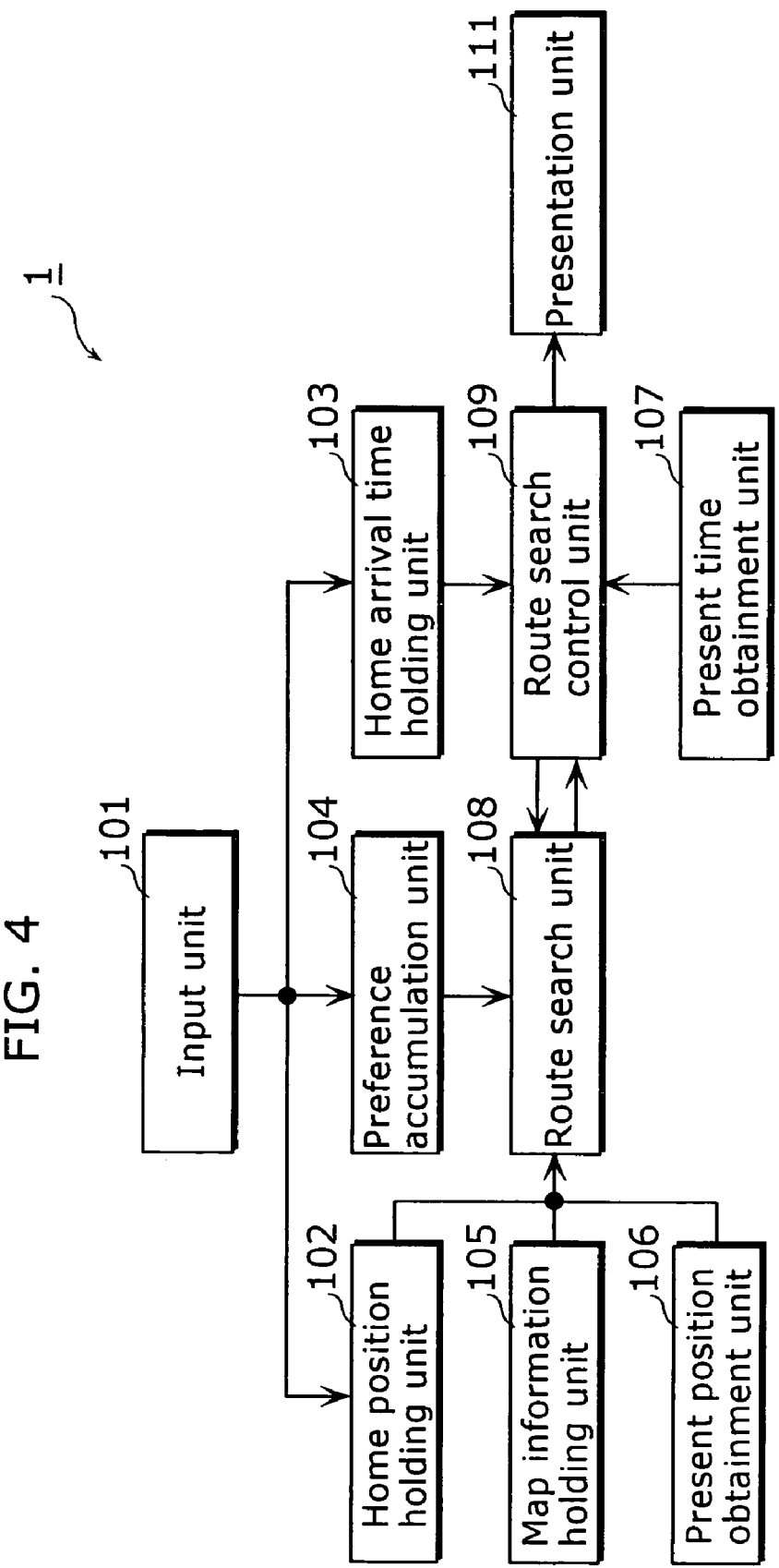
FIG. 4 is a functional block diagram showing the system configuration of the in-vehicle information apparatus 1 described in the first embodiment of the present invention.

FIG. 4 is a functional block diagram showing the system configuration of the in-vehicle information apparatus 1 according to the first embodiment of the present invention.

As shown in FIG. 4, the in-vehicle information apparatus 1 is composed of an input unit 101, a home position holding unit 102, a home arrival time holding unit 103, a preference accumulation unit 104, a map data (information) holding unit 105, a present position obtainment unit 106, a present time obtainment unit 107, a route search unit 108, a route search control unit 109 and a presentation unit 111.

The input unit 101 lets the user input a position of the user's home, a desired home arrival time that is desired by the user to return home from a certain place, and route selection preferences which are user's preferences for selecting a route. To be more precise, the remote controller 20 and the communication interface 110 are equivalents of the input unit 101.

The home position holding unit 102 holds the position of the user's home inputted from the input unit 101. To be more precise, the home position 182 stored in the HD 180 is an equivalent of the home position holding unit 102.

The home arrival time holding unit 103 holds the desired time to come home that is inputted from the input unit 101.

To be more specific, the home arrival time 183 stored in the HD 180 is an equivalent of the home arrival time holding unit 103.

The preference accumulation unit 104 accumulates the route selection preference inputted by the input unit 101 and is an equivalent of the route selection preference 184 stored in the HD 180. It should be noted that the preference accumulation unit 104 accumulates the preference for each of the items listed as route selection preferences selected by the user, and stores in advance the route with which the required time is shortened as a result of the selection. Such information like the position of a user's home, a desired home arrival time and route selection preferences are to be reused for the next drive once the information is stored in the disk. It is therefore preferable that the information be stored in the HD 180 or a nonvolatile memory (SRAM, a FLASH memory, and others) so that the user does not need to input the information each time he/she drives.

The map data holding unit 105 stores beforehand map information in order to provide the map information for the route search unit 108. In more detail, the map data holding unit 105 is an equivalent of the map information 181 stored in the HD 180, but the map data holding unit 105 may be composed of a CD-ROM reader or a DVD-ROM reader for reading out a CD-ROM or DVD-ROM in which electronic map information for navigation is stored.

The present position obtainment unit 106 obtains a present position of the vehicle.

To be more precise, the GPS apparatus 140 is an equivalent of the present position obtainment unit 106. It should be noted that the present position obtainment unit 106 may mount the direction sensor 160 for measuring the direction of the vehicle and the driving sensor 150 for measuring the speed of the vehicle with the view to improve the accuracy in presenting the position. The present position obtainment unit 106 may also employ a method for identifying the present position on the map based on the information on the moving of the vehicle and the map information obtained from the map data holding unit 105 together with the signals from the GPS.

The present time obtainment unit 107 obtains a present time using a sensor to measure time. To be more concrete, the timer 191 is an equivalent of the present time obtainment unit 107.

The route search unit 108 searches for a route in accordance with the user's preference from among the possible routes between the present position and the position of the user's home based on the route selection preferences that are accumulated in the preference accumulation unit 104. The route search unit 108 then calculates a required time to come home in the case where the searched route is used. The CPU 190 is an equivalent of the route search unit 108.

The route search control unit 109 determines whether or not the user can come home by the desired arrival time in view of the time that is required for taking the searched route by using (i.e., comparing) the present time, the desired time to come home and the required time to get home which is calculated by the route search unit 108 (modifiable depending on the route). When judging that the user can get home by the desired home arrival time (present time+required time to get home≦desired home arrival time), the route search control unit 109 calculates a departure time that is the time for the user to leave the place to get home based on the required time which is calculated by the route search unit 108, and the desired time to come home (departure time=desired home arrival time−required time to get home).

When judging that the user cannot get home by the desired home arrival time (present time+required time to get home>desired home arrival time), the route search control unit 109 requests the route search unit 108 to modify the route selection preferences so as to shorten the required time and then search the route again. The CPU 190 is an equivalent of the route search control unit 109.

The presentation unit 111 presents to the user the route to the user's home which is selected by the route search unit 108 and the departure time which is calculated by the route search control unit 109. The display unit 130 and the speaker 30 are equivalents of the presentation unit 111.

The following describes the operation that is performed by the in-vehicle information apparatus according to the first embodiment structured as described above.

It should be noted that the processing of TV replay and normal navigation is the same as the one which is performed by the conventional in-vehicle information apparatus, so the description thereof is omitted here. The following explanation focuses on the operation for the case of returning home, which is unique to the present invention.

Figure 5:
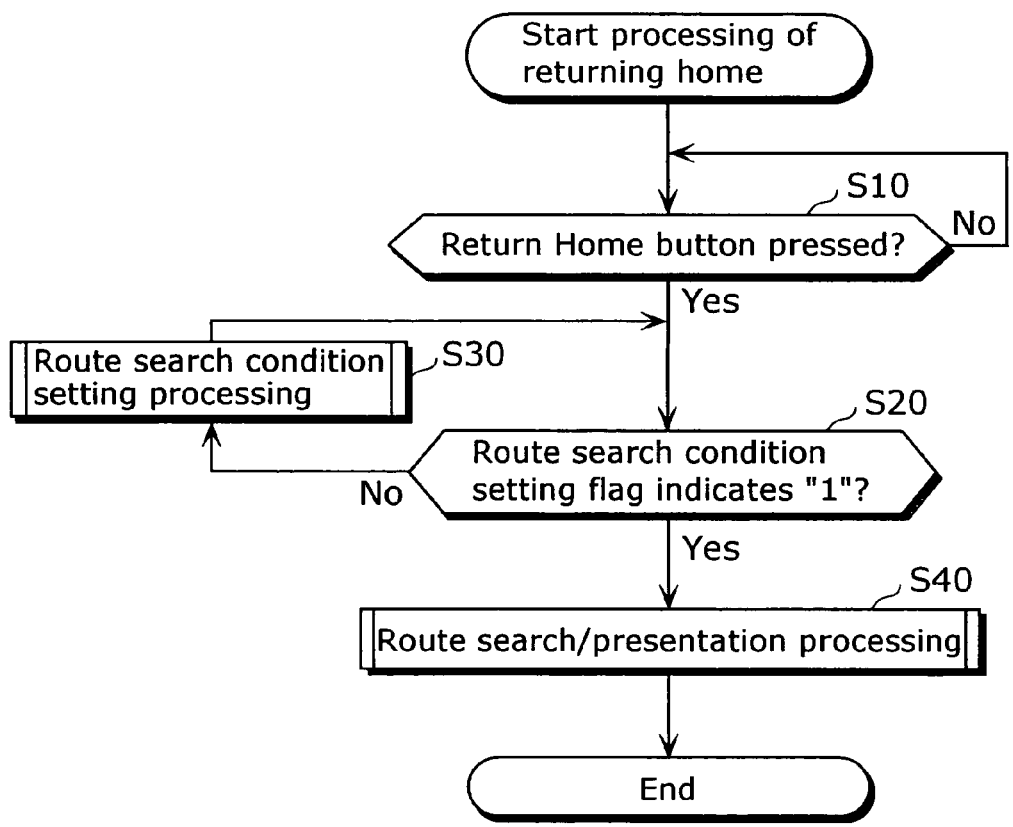
FIG. 5 is a flowchart showing the entire flow of the operation performed by the in-vehicle information apparatus 1 according to the first embodiment of the present invention.

FIG. 5 is a flowchart showing the entire flow of the operation performed in the first embodiment.

The CPU 190 firstly waits for the Return Home button 211 to be pressed down (depressed) (S10). When the Return Home button 211 is pressed (Yes in S10), the CPU 190 judges whether or not a route search condition setting flag, presenting whether or not the route search conditions are already set, is set to "1" (S20). When the route search condition setting flag does not indicate "1", namely when it indicates "0" (No in S20), the CPU 190 sets the route search conditions and sets the route search condition setting flag to "1" (S30). When the route search condition setting flag indicates "1" (Yes in S20), the CPU 190 performs route search/presentation processing for presenting to the user the result of the route search, the departure time and other information (S40).

Figure 6:
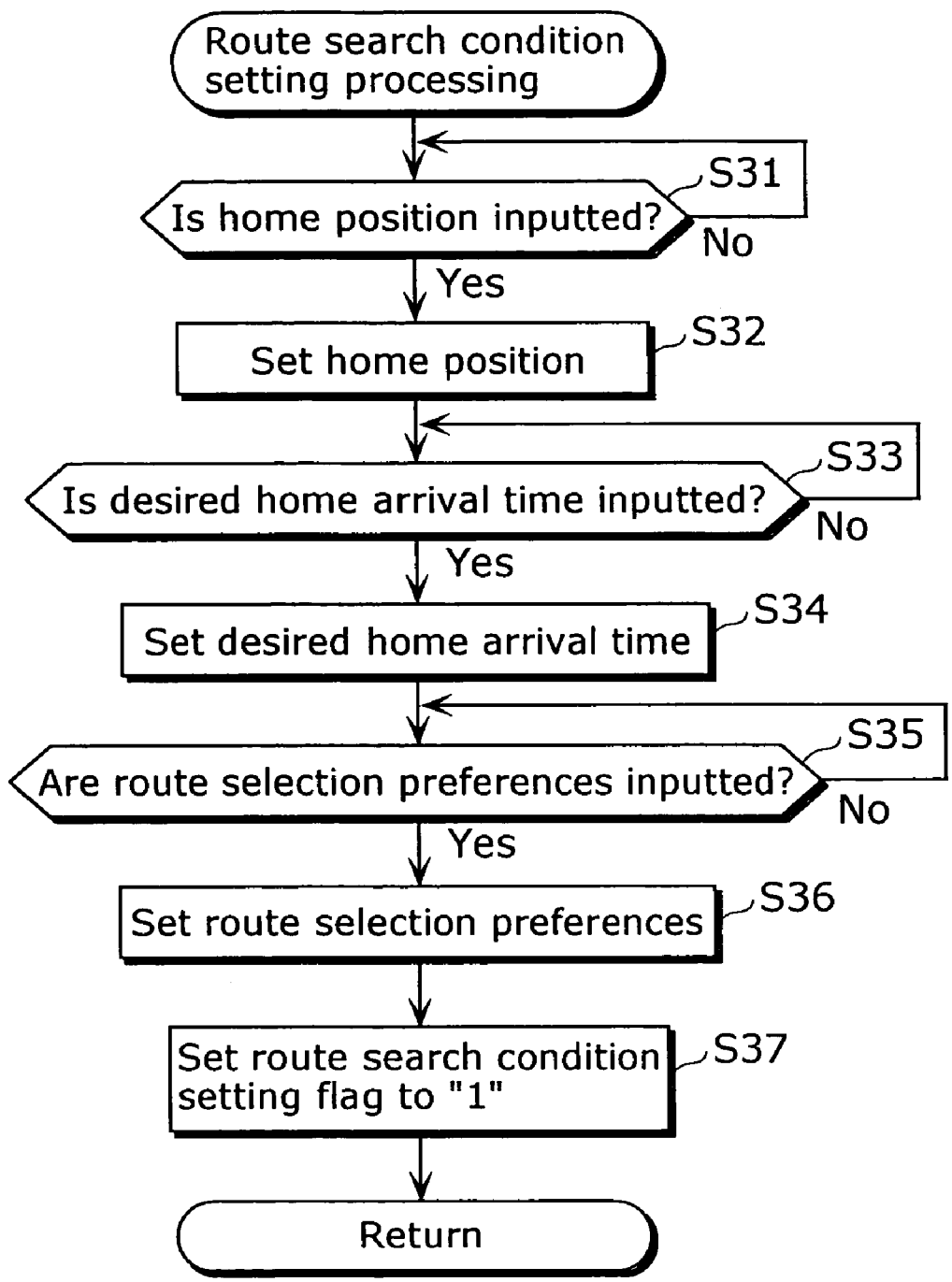
FIG. 6 is a flowchart showing the sub-routine of the route search condition setting processing (S30) shown in FIG. 5.

FIG. 6 is a flowchart showing the sub-routine in the route search condition setting processing (S30) shown in FIG. 5.

In the route search condition setting processing, the CPU 190 waits for the position of the user's home to be inputted (S31). The screen is displayed for the input of the position, as shown in FIG. 7, for example. Four items for the setting are displayed on the screen to set the position of the user's home: "Map", "Telephone number", "Address" and "Coordinates".

The user can input a position coordinate of his/her home in a desired manner by marking any of the check boxes 71–74 corresponding to each of the items. When the check box 71 is checked, for example, the monitor screen displays the map information stored in the map data holding unit 105 and a cursor for identifying the position of the user's home, and when the user places the cursor on the position indicating the user's home while looking at the displayed map, the position coordinates, such as latitude and longitude, of the user's home position is inputted based on the position of the cursor. When any of the check boxes 72–74 is checked, the position coordinate of the user's home position is inputted either by inputting the telephone number, address or latitude/longitude in the text boxes 72a, 73a or 74a/74b set for each of the items. When the position coordinate of the user's home position is inputted by any of such operations and the Select button 202 on the remote controller 20 is pressed (Yes in S31), the CPU 190 sets the user's home position by storing the position coordinate of the user's home position in the home position holding unit 102 (S32).

After the setting of the user's home position, the CPU 190 waits for a desired home arrival time to be inputted (S33). For inputting the desired home arrival time, the screen to set the home arrival time is displayed as shown in FIG. 8, for instance. A spin box 81 is set for inputting the home arrival time on the screen. The user inputs, for instance, a curfew time "21:30" as the home arrival time by operating the arrow of the spin box 81. When the home arrival time is inputted by such operation and the Select button 202 on the remote controller is pressed (Yes in S33), the CPU 190 sets the home arrival time by storing the home arrival time in the home arrival time holding unit 103 (S34). It should be noted that, as a method for inputting the desired home arrival time, the method of selecting one by one the numbers corresponding to the time out of the numbers "0" through "9" displayed on the screen can be employed, e.g., "2" "1" "3" and "0" in the case of setting the time "21:30".

Figure 9:
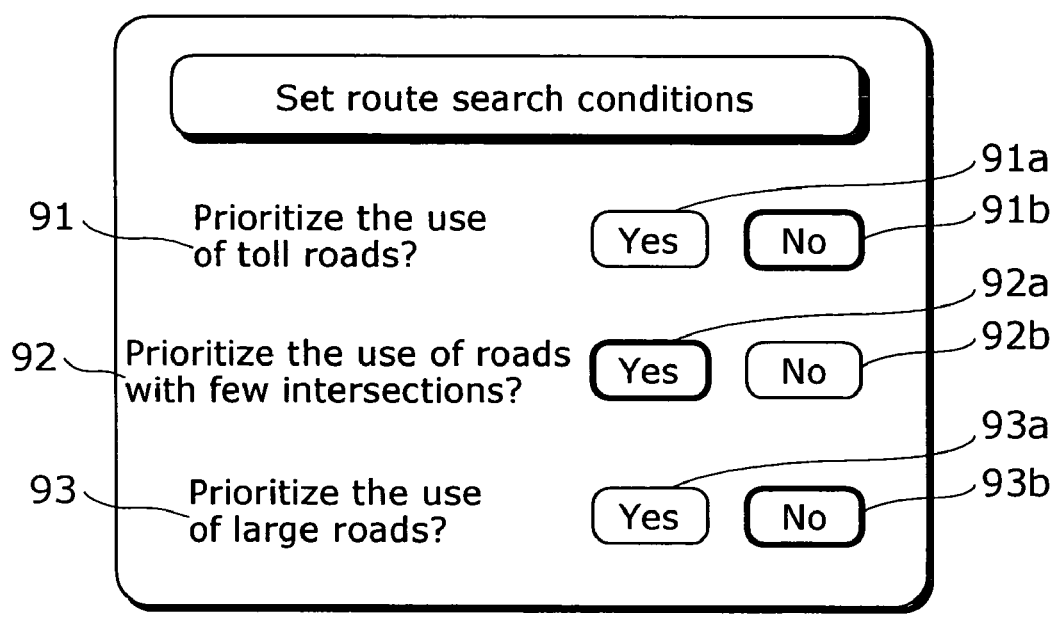
FIG. 9 shows an example of the screen to set the conditions to search for a route.

After the setting of the home arrival time, the CPU 190 waits for the route selection preferences to be inputted (S35). For inputting the route selection preferences, the screen to set the route search conditions is displayed as shown in FIG. 9, for instance. Three items of 91–93 are listed on the setting screen for the route search condition in advance: "Prioritize the use of toll roads", "Prioritize the use of roads with few intersections" and "Prioritize the use of large roads". Whether or not to include ("Yes" or "No") each of the items 91–93 is respectively selected according to the user's preference. In the example shown in FIG. 9, the button 91b "No" is selected for the item 91 "Prioritize the use of toll roads", the button 92a "Yes" is selected for the item 92 "Prioritize the use of roads with few intersections" while the button 93b "No" is selected for the item 93 "Prioritize the use of large roads", which are to be inputted as route selection preferences. When the route selection preferences are inputted by such operation and the Select button 202 on the remote controller 20 is pressed (Yes in S35), the CPU 190 sets the route selection preferences by storing the selected preferences in the preference accumulation unit 104 (S36).

Thus, having set the user's home position, the home arrival time, and the route selection preferences, the CPU 190 sets the route search condition setting flag to "1" (S37) and returns to the main routine shown in FIG. 5.

It should be noted that it is preferable for the user to set such route search conditions before starting driving in order to avoid any accidents caused by inattentive driving since the setting of the route search conditions requires various operations.

Here, the settings of the user's home position, desired home arrival time and route selection preferences to be operated by the user are required only for the case where such conditions are not yet set by the user and once such information is inputted (Yes in S20), the route search/presentation processing is performed with the conditions that are already set, without repeating the same operation.

Therefore, it is possible to present to the user the information on the departure time to leave the place without the cumbersome operation for the user to set the conditions each time he/she drives.

Figure 10:
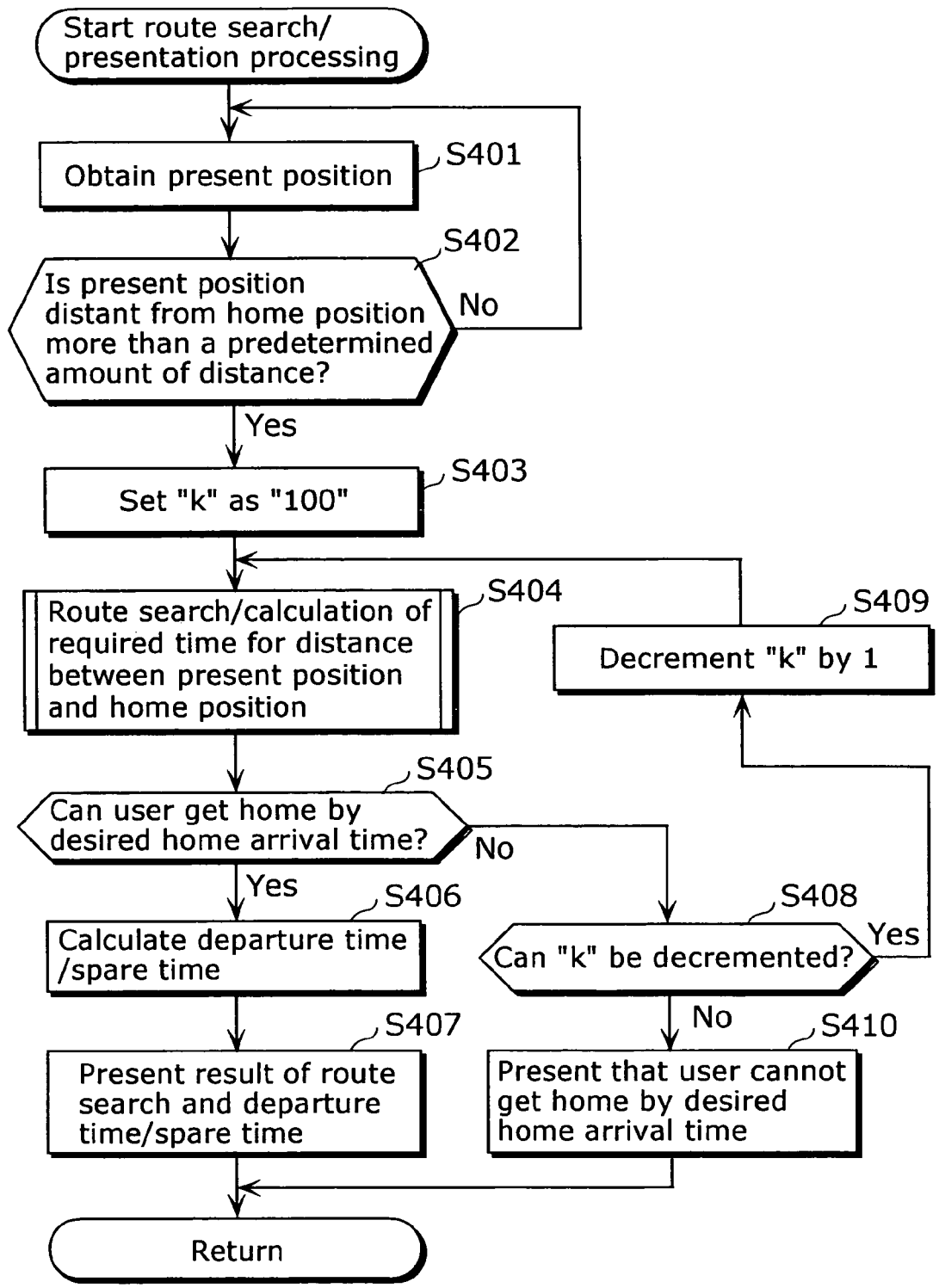
FIG. 10 is a flowchart showing the sub-routine of the route search/presentation processing (S40) shown in FIG. 5.

FIG. 10 is a flowchart showing the sub-routine of the route search/presentation processing (S40) shown in FIG. 5.

In the route search/presentation processing that is operated by the CPU 190 during the user's drive, the present position obtainment unit 106 firstly obtains the present position of the vehicle (S401) while the route search unit 108 waits until the present position is distant from the user's home position more than a predetermined amount of distance (S402). This is because the user can come home immediately within a predetermined amount of distance. Here, the distance for judging whether or not the vehicle is sufficiently distant from the user's home position may be specified by the user for a case where the user parks his/her car in the garage distant from home.

When the vehicle drives away from home more than the predetermined amount of distance (Yes in S402), the route search unit 108 sets "k" indicating a degree of matching the user's route selection preferences (hereinafter to be referred to as "preference matching degree") as "100 (%)" (S403), searches for the route corresponding to the user's preferences, and calculates the required time for a distance between the present position and the user's home position using the searched route (S404).

Figure 11:
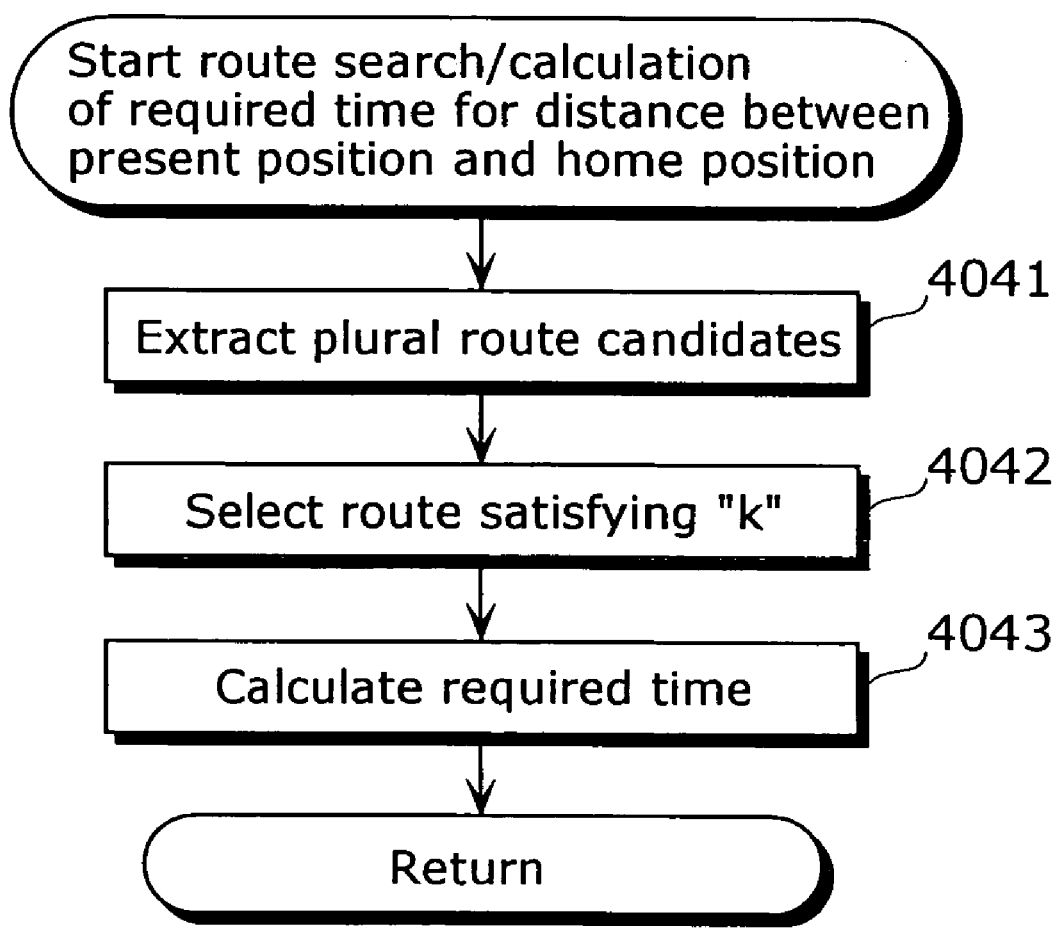
FIG. 11 is a flowchart showing the sub-routine of Step S404 shown in FIG. 10.

FIG. 11 is a flowchart showing the sub-routine of Step S404.

In the sub-routine, the route search unit 108 firstly extracts a candidate for the route from the present position to the user's home position based on the map information stored in the map data holding unit 105. When plural candidates are extracted as a result of the extraction (S4041), the route search unit 108 selects the route with a preference matching degree that is greater than "k" satisfying the route search conditions out of the extracted plural route candidates (S4042), and then calculates a required time for the selected route candidate (S4043). It is a common method to calculate the required time based on the map information stored in the map data holding unit 105 with the use of the information such as a driving distance and an average speed.

After having calculated the required time, the CPU 190 adds the present time and the required time and judges whether or not the user can get home by the desired time, by comparing the result of the addition and the home arrival time (S405).

When it is judged that the user can get home by the desired time (Yes in S405), the CPU 190 calculates the departure time for arriving home on time or the spare time that is generated in the case in which the user immediately departs for home (S406), and presents either the calculated departure time or the spare time (S407).

When it is judged that the user cannot get home by the desired time (No in S405), the CPU 190 judges whether or not the preference matching degree "k" can be reduced in view of elements to reduce time (S406). Here, the reduction of the preference matching degree "k" in view of elements to reduce time means to select "No" when "Yes" is selected for the item "Prioritize the use of toll roads" or to select "Yes" when "No" is selected for the item "Prioritize the use of roads with few intersections" or to select "No" when "Yes" is selected for the item "Prioritize the use of large roads". That is, a route is selected that can reduce the time in such a manner that the route does not reflect the user's preferences.

In the case where the preference matching degree "k" can be reduced, the CPU 190 decrements the preference matching degree "k" by "1" (S409). That means, for example, when "No" is selected for the item "Prioritize the use of toll roads" of the route selection preferences inputted by the user, toll roads are selected. Then, under the conditions defined in the preference matching degree "k", the route is searched and the required time to get home using the searched route is calculated (S404). In a case in which the user cannot get home by the desired time even after the change in the settings (No in S405), the route selection preferences can be repeatedly modified (e.g., selecting roads with more intersections or small streets) in order to search out the route that allows the user to come home by the desired home arrival time (Yes in S408, S409).

That is to say, at the first stage, a route to home is searched for with the preference matching degree "k" indicating "100", and whether or not the user's route selection preferences have to be modified in the route search, namely, whether or not the route search control unit 109 has requested a modification in the route selection preferences, is determined (S405).

Figure 12:
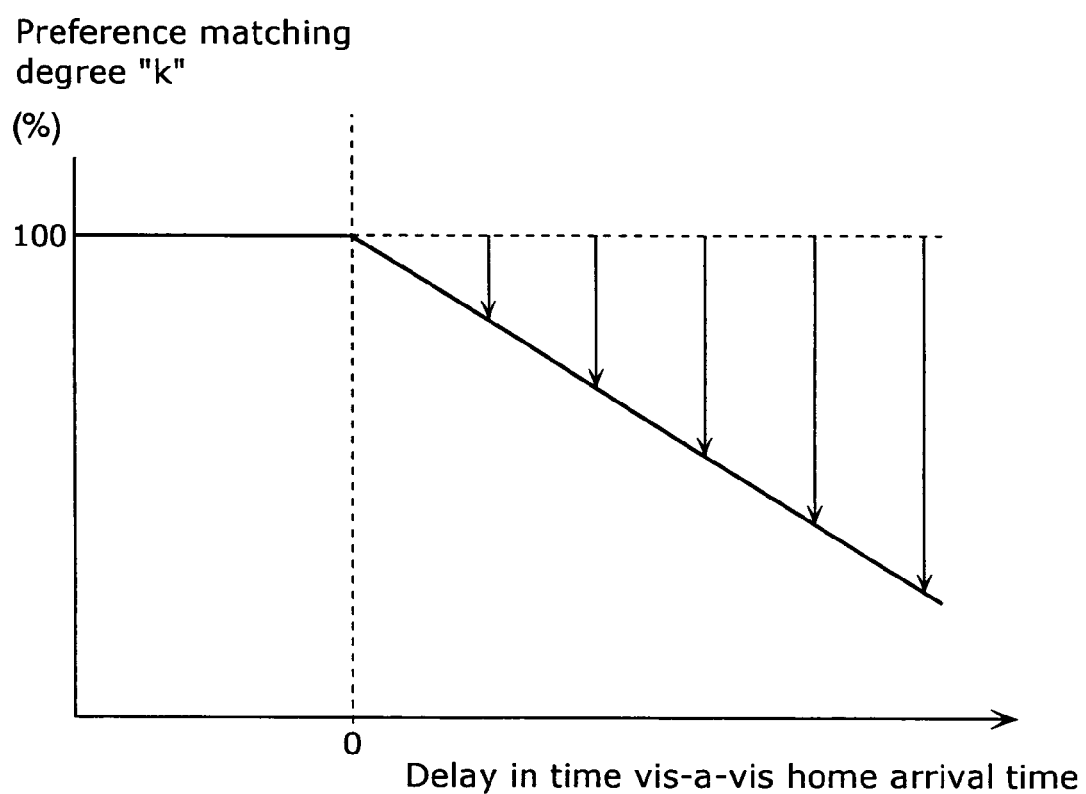
FIG. 12 is a graph showing the relation between the degree of preference matching "k" and the delayed time vis-à-vis the home arrival time, where "k" indicates 100%.

In the case where the route selection preferences do not need to be changed (Yes in S405), that is, the user can come home by the desired time with the preference matching degree "k" indicating "100" as shown in FIG. 12, the user's route selection preferences which are accumulated in the preference accumulation unit 104 are used as conditions for route search without any modifications.

In the case where the route selection preferences need to be modified, the item which does not reflect the user's preference but reduces the required time is extracted from the items in the route selection preferences which are accumulated in the preference accumulation unit 104, and the user's route selection preferences, which are partly changed to reduce the required time, are used as conditions for the route search (S409). In more detail, even when the user has already set the route selection preferences as "prioritize toll-free roads over toll roads", the value of the preference matching degree "k" can be decremented by using the method of not reflecting user's preference. This is because, in general, when comparing the case of using toll roads and the case of not using them, the former case reduces the required time.

The route search control unit 109 judges whether or not the user can come home by the desired time based on the required time thus calculated. (S405). For example, it is judged as possible in the case where the result of subtracting the calculated required time from the desired home arrival time stored in the home arrival time holding unit 103 is later than the present time obtained by the present time obtainment unit 107.

When it is judged that the user can come home by the desired time in Step S405, the route search control unit 109 calculates the departure time to leave the present position (S407). The time to leave the present position is obtained by subtracting the required time that is calculated by the route search unit 108 from the desired home arrival time stored in the home arrival time holding unit 103. Considering the fact that the time actually required increases or decreases more or less as compared to the required time that is again until the route which allows the user to come home by the desired time is searched out and the route and the departure time thus obtained are presented on the presentation unit 111. Here, it is preferable to present to the user that the route and the departure time are the result of the modification made in the user's route selection preferences as well.

Figure 14:
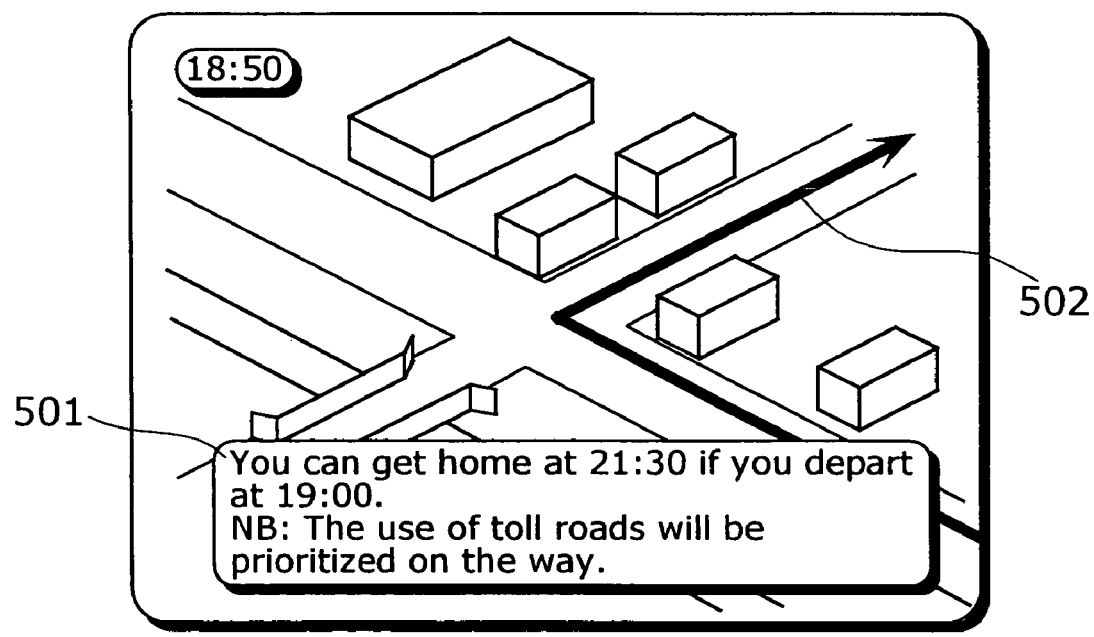
FIG. 14 shows an example of displaying the searched information when the degree of preference matching "k" is decremented.

FIG. 14 shows an example of the presentation made by the presentation unit 111 when the user's route selection preferences are modified.

FIG. 14 shows an example of selecting the route that cannot be selected in the case where one of the user's route preferences is not applied "prioritize toll-free roads", as a result of making the route search with the modification in the user's route preferences so as to allow the user to come home in time. In this example, the departure time and the fact that the route selection preference has been modified are presented in the character information 501. The route to home 502 is also presented together with the character information 501.

When the route search control unit 109 judges that the required time can no longer be reduced even when the route selection preferences are modified, that is, the value of the preference matching degree "k" cannot be decremented, the presentation unit 111 presents to the user that the user cannot reach home by the desired time (S410).

Figure 15:
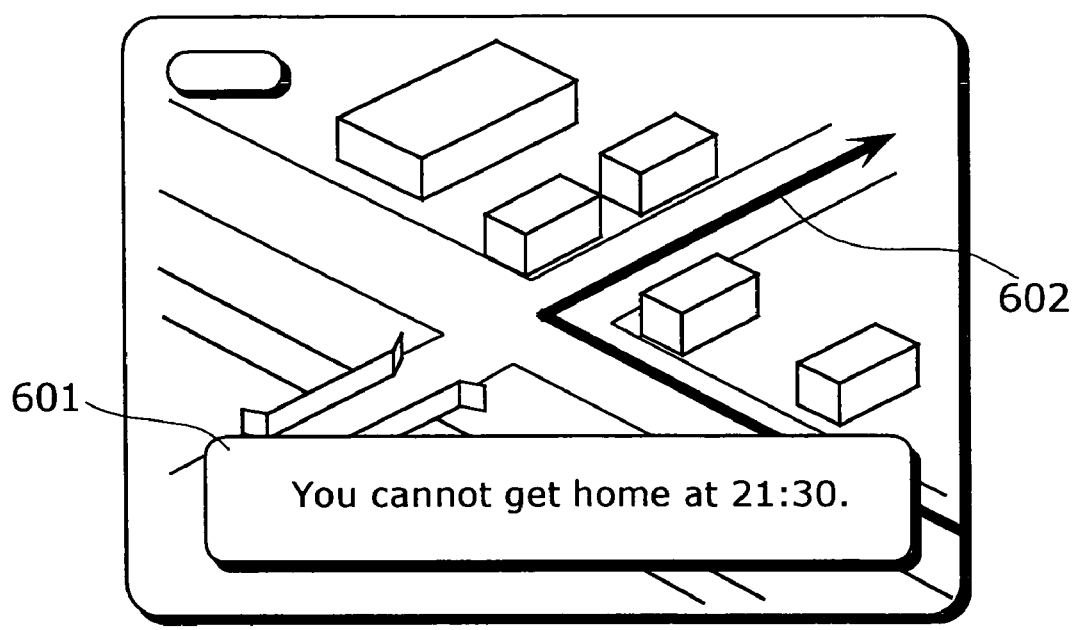
FIG. 15 shows an example of displaying the searched information when the user cannot come home by the home arrival time.

FIG. 15 shows an example of the presentation made by the presentation unit 111 when the user cannot come home in time.

In the example shown in FIG. 15, the character information 601 presents that the user cannot get home by the curfew "21:30". Here, the route 602 that is the route by which the user can get home with the shortest time is presented together with the character information 601.

As is apparent from the above description, the in-vehicle calculated by the route search unit 108 because of traffic situations, the departure time may be set earlier in view of the delay vis-à-vis the desired home arrival time generated in such case.

Therefore, in the case where it is judged that the route which reflects the user's preferences does not allow the user to get home by the desired time, the route search is operated by automatically changing the degree of reflecting the user's preference.

Then, the presentation unit 111 presents to the user the route selected by the route search unit 108 and the departure time calculated by the route search control unit 109 (S407).

Figure 13:
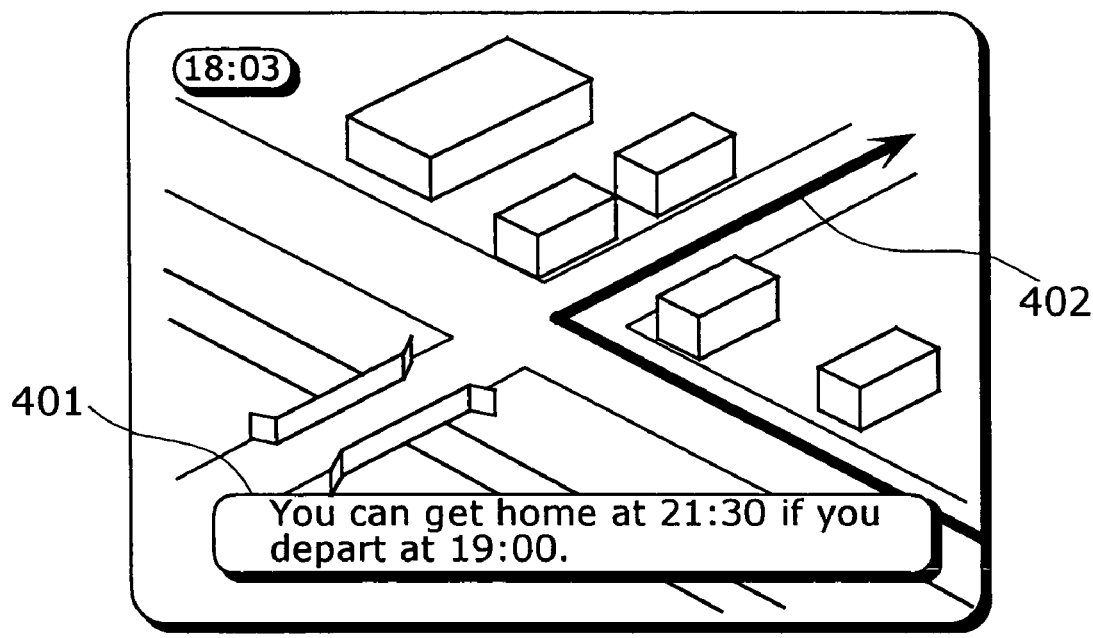
FIG. 13 shows an example of displaying the searched information where the degree of preference matching "k" indicates 100%.

FIG. 13 shows an example of the case of presenting the route and the departure time on the monitor screen.

In FIG. 13, the departure time "19:00" is presented in the character information 401 while the route to home 402 is described on the map. It should be noted that the route search is operated repeatedly after the presentation unit 111 has presented the departure time. The presentation unit 111 varies the contents to be presented when the present position of the vehicle is changed or when the user has not departed for home even after the departure time presented by the presentation unit 111 has passed.

In Step S405, when it is judged that the route searched by the route search unit 108 does not allow the user to get home by the desired time, the route search control unit 109 inquires the route search unit 108 whether or not there is a possibility of reducing the required time by modifying the route selection preferences (S408). When there is such a possibility, the route search control unit 109 instructs the route search unit 108 to modify the route selection preferences and search for the route again. The route search unit 108 follows the instruction, makes some modifications in the route selection preferences so as to shorten the required time (S409) and searches again for the route to home. The modification of the route selection preferences and the operation of route search are repeated information apparatus 1 according to the first embodiment selects automatically the route reflecting the user's preferences within a range which allows the user to get home by the desired time just by operating the Return Home button 211 without any cumbersome operations, and then, informs the user of the departure time to leave the present position. Thus, it is possible for the user to reach home by the desired time using the route reflecting, at maximum, the user's preferences, without minding the time.

It should be noted that in the first embodiment described above, the route to home is searched when the Return Home button 211 is pressed, but the present invention is not limited to such a static case. The route to home may be searched (again) in a dynamic timing such as when every predetermined period of time is passed, when every predetermined moving distance is surpassed, when the vehicle stops at an intersection, when VICS information such as new traffic information is obtained, and when the user's vehicle goes off the guide (returning) route. For example, when watching the TV in a TV reception mode, a message of "Would you like the route to be displayed?" and three buttons of "Yes", "No" and "Not to be, displayed again" may be displayed on the screen, and in the case where the user clicks on "Yes", the route to home may be displayed. When the user cannot reach home in time with the preference matching degree "k" indicating "100", the route to home may be definitely displayed.

A hands-free function linked with a cell phone may be incorporated in the in-vehicle information apparatus 1 in order to allow the cell phone to use an application for guiding a route to home when the user leaves his/her vehicle and to notify the user by means of the cell phone of the departure time under the condition where the preference matching degree "k" indicates 100. When the user arrives home later than the intended time, an e-mail may be sent to the family automatically in order to inform of the delay by using the cell phone.

Furthermore, in the case where the route search is operated again by modifying the preferences (preference matching degree "k") relating to the selection of the route, the preferences accumulated in the preference accumulation unit 104 may be updated to the preference matching degree "k" after the modification. In such a case, it is preferable to update the preference matching degree "k" based on the change tracking but not immediately.

The first embodiment describes the case in which the driver is specified among the family members. However, in a case where plural family members drive, a route reflecting the user's preferences is automatically searched out within the range in which the user can get home by the desired time, corresponding to the driver's home arrival time and the route selection preferences so that the user is informed of the departure time to leave the place.

For example, when Hiromi (father), Usagi (mother) and Momo (daughter) drives the car, the home arrival times and the route selection preferences are set beforehand in a home arrival time table 183b shown in FIG. 16 as well as in a route selection preference table 184b shown in FIG. 17 so that the display of the in-vehicle information apparatus as a main body 10 displays the screen to set a driver which is shown in FIG. 18 and specifies the driver before the navigation starts.

In the example shown in the home arrival time table 183b shown in FIG. 16, the home arrival time is set as 23:00 for Hiromi and is set as 21:30 for Momo while it depends on the day of the week (14:00 on Monday, 16:00 on Wednesday, 13:00 on Thursday, 18:00 on other days) for Usagi since she gives lessons in her piano class to the children in the neighborhood.

In the example of the table of route selection preferences shown in FIG. 17, the preferences are respectively set for each of the items "Prioritize the use of toll roads?", "Prioritize the use of roads with few intersections?" and "Prioritize the use of large roads?" according to each user's personal preference. For example, "Yes" "No" and "No" are set for Hiromi while "Yes" "No" and "No" are set for Usagi and Momo.

Moreover, in the example of the screen for setting a driver shown in FIG. 18, driver icons representing Hiromi, Usagi and Momo are shown together with the message "Set a driver of the vehicle. Please touch a driver icon". It should be noted that a touch panel is mounted on the surface of the display 130. When, for example, the driver icon representing Usagi is touched, Usagi's home arrival time is read out from the home arrival time table 183b and Usagi's route selection preferences are read out from the route selection preference table 184b. In this way, the home arrival time and the user's preferences as well as the way to select a route can be modified according to the driver. Therefore, the route reflecting the user's preferences is automatically searched for within the range in which the user can get home by the desired time, and the user is informed of the departure time to leave the place he/she visits depending on the day.

It should be noted that, in the above example, the driver is specified by the explicit input from the user, but it may be identified by fingerprint at the time when the driver grips the handle or by retina identification.

When the home addresses are different among the users, the user's home position may be set depending on the user.

Furthermore, the in-vehicle information apparatus 1 may be equipped with a hands-free function linked to the cell phone to let the cell phone succeed the application of the route guiding for returning home when the user leaves the vehicle. Thus, the cell phone obtains the route reflecting the user's preferences within a range in which the user carrying the cell phone can get home by the desired time and inform the user of the departure time to leave the place, not limited to the case of informing the departure time for the route which satisfies the preference matching degree k=100%.

Thus, when obtaining the route reflecting the user's preferences within a range in which the user can get home by the desired time by means of the cell phone, routes which can be accessed by walking, by train, bus, and taxi as well as timetables and fare information need to be presented since the user may walk or take train, bus or taxi. However, with the limited capacity of memory, it is difficult to store all the information such as maps, train/bus maps, timetables, and fare information. Consequently, it is preferable to establish a system in which the cell phone and the server co-operate in guiding the route to be taken by the user, letting the external server store the information as described above.

Second Embodiment

Figure 19:
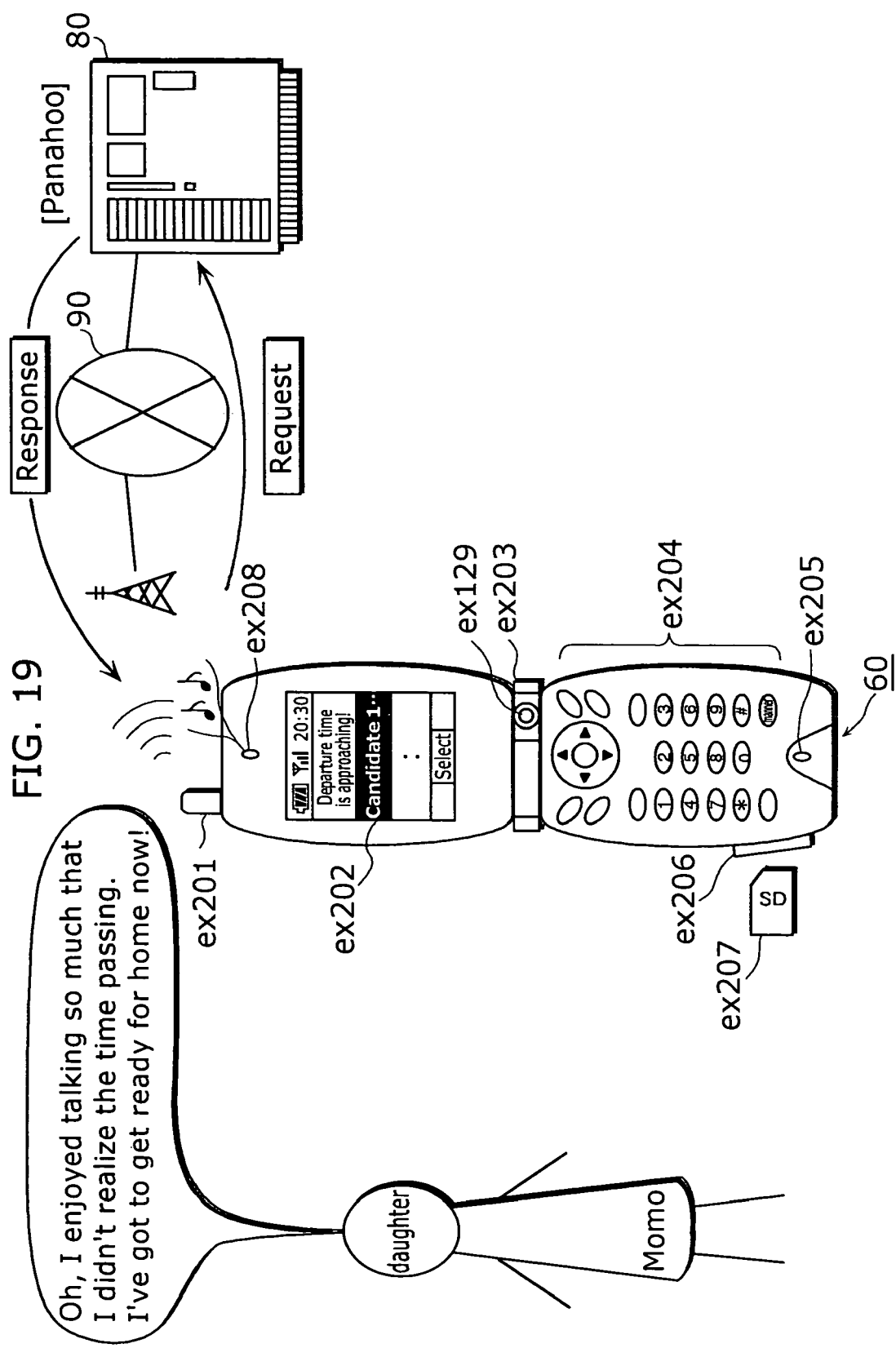
FIG. 19 shows an overall configuration of the communication system 2 according to a second embodiment of the present invention.

FIG. 19 shows an overall configuration in the case of applying the information presentation apparatus according to the second embodiment of the present invention to a communication system 2.

The communication system 2 attempts to facilitate the assistance for the user to get home by displaying the route for home and the home arrival time as the time passes, and includes a cell phone 60 and a server 80 for communications via a network 90 such as the Internet that is a wireless transmission line.

The cell phone 60 is a communication apparatus carried by a certain user (e.g., Momo), which accesses the server 80 if necessary and sends/receives various kinds of data such as route information, bus/train maps and maps which are necessary for returning home. The cell phone 60 is composed of the following: an antenna ex201 for sending/receiving electric waves between cell stations; a camera unit ex203 for shooting still pictures, which includes a CCD ex129, a flash, and others; a body consisting of operational keys ex204; a voice output unit ex208, composed of a speaker and others, for outputting music and voice in conversation; a voice input unit ex205, mainly composed of a microphone and others, for inputting a user's voice; a storage medium ex207 for storing the data of the still pictures shot by a digital camera or the like; a slot unit ex206 for mounting the storage medium ex207; a display unit ex202 consisting of an LCD for displaying the route information, route map and map received via the antenna ex201. The cell phone 60 obtains from the server 80, in advance, the following information: a route to home from the present position to the user's home position, which reflects the user's preference; a required time for taking the route to home; and a departure time by which to leave the present position in order to get home by the desired time. The cell phone 60 then compares the obtained departure time and the present time and presents to the user the departure time and the route to home before the departure time is passed.

The server 80 stores beforehand the information such as maps, bus/train maps, bus/train timetables and train/bus/taxi fare information, and sends the route information, including the route to home with the user's preferences reflected, the required time for taking the route to home and the departure time to leave the present position in order to get home by the desired time, as well as the route maps and maps, based on the request for such information made by the cell phone 60.

Figure 20:
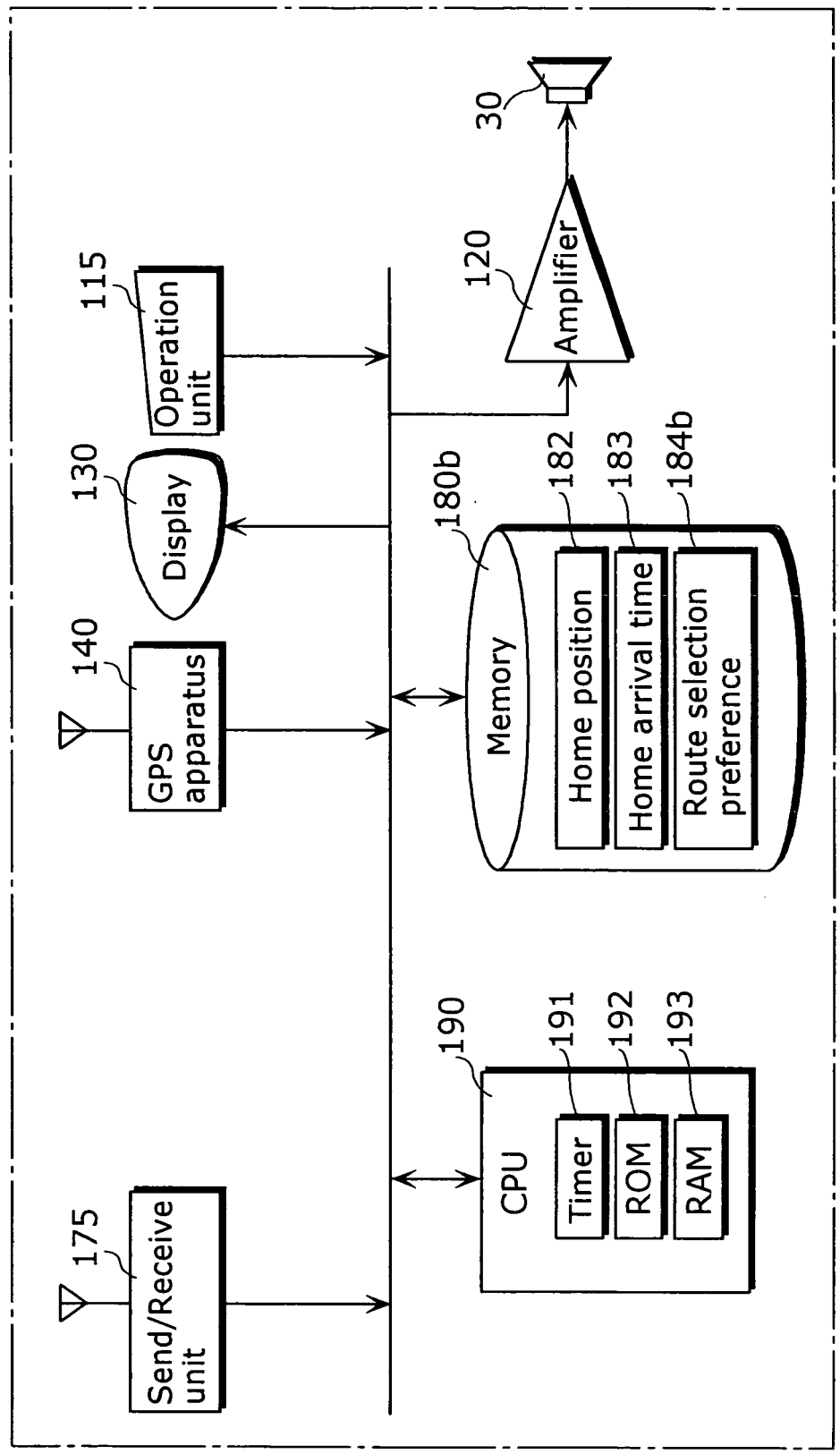
FIG. 20 shows a hardware configuration of the cell phone 60 shown in FIG. 19.

FIG. 20 is a block diagram showing the hardware configuration of the cell phone 60 shown in FIG. 19. It should be noted that the same reference numbers are used for the parts corresponding to the components in the in-vehicle information apparatus 1 and the description of these same components is omitted. Here, only the components which are necessary for portable navigation are shown in FIG. 20.

As can be seen in FIG. 20, the cell phone 60 is composed of the speaker 30, an amplifier 120, the display 130, the GPS apparatus 140, the CPU 190 as well as an operation unit 115, a send/receive unit 175 and a memory 180b.

The operation unit 115 is composed of the operational keys ex204, and receives various kinds of operations from the user.

The send/receive unit 175 sends a request to transmit route information including the user's home position, home arrival time and route selection preferences towards the server 80 and receives the route information, train/bus maps and maps which are transmitted from the server 80.

The memory 180b is composed of an SRAM, a flash RAM, and others, and stores a home position 182, a home arrival time 183 and a route selection preference 184b respectively in the form of a table.

FIG. 21 shows a structural example of the table for storing the home position 182, the home arrival time 183 and the route selection preference 184b.

As shown in FIG. 21, this table stores "Momoyamadai, Suita-City" as the user's home position and "21:30" as a home arrival time. The table also has "Order of priority in a means of transportation", "Prioritize a total amount of fares", and "Order of priority for walking routes" as route selection preferences. As the item "Order of priority in a means of transportation", an order of train, bus, taxi and on foot is stored. For the item "Prioritize a total amount of fares", "Yes" is stored. For the item "Order of priority for a route on foot", an order of priority of "Avoid roads with dark places" and "Shortest route" are stored as the first and second to be prioritized.

The CPU 190 creates a route information obtainment request including the home position 182, the home arrival time 183 and the route selection preference 184b stored at a predetermined timing in the table as well as the present position obtained by the GPS apparatus 140 and transmits the request via the send/receive unit 175. The CPU 190 then compares the departure time included in the route information and the present time measured by a timer 191 after having received the route information transmitted from the server 80, and presents to the user the departure time and the route to home via the speaker 30 before the departure time is passed.

Figure 22:
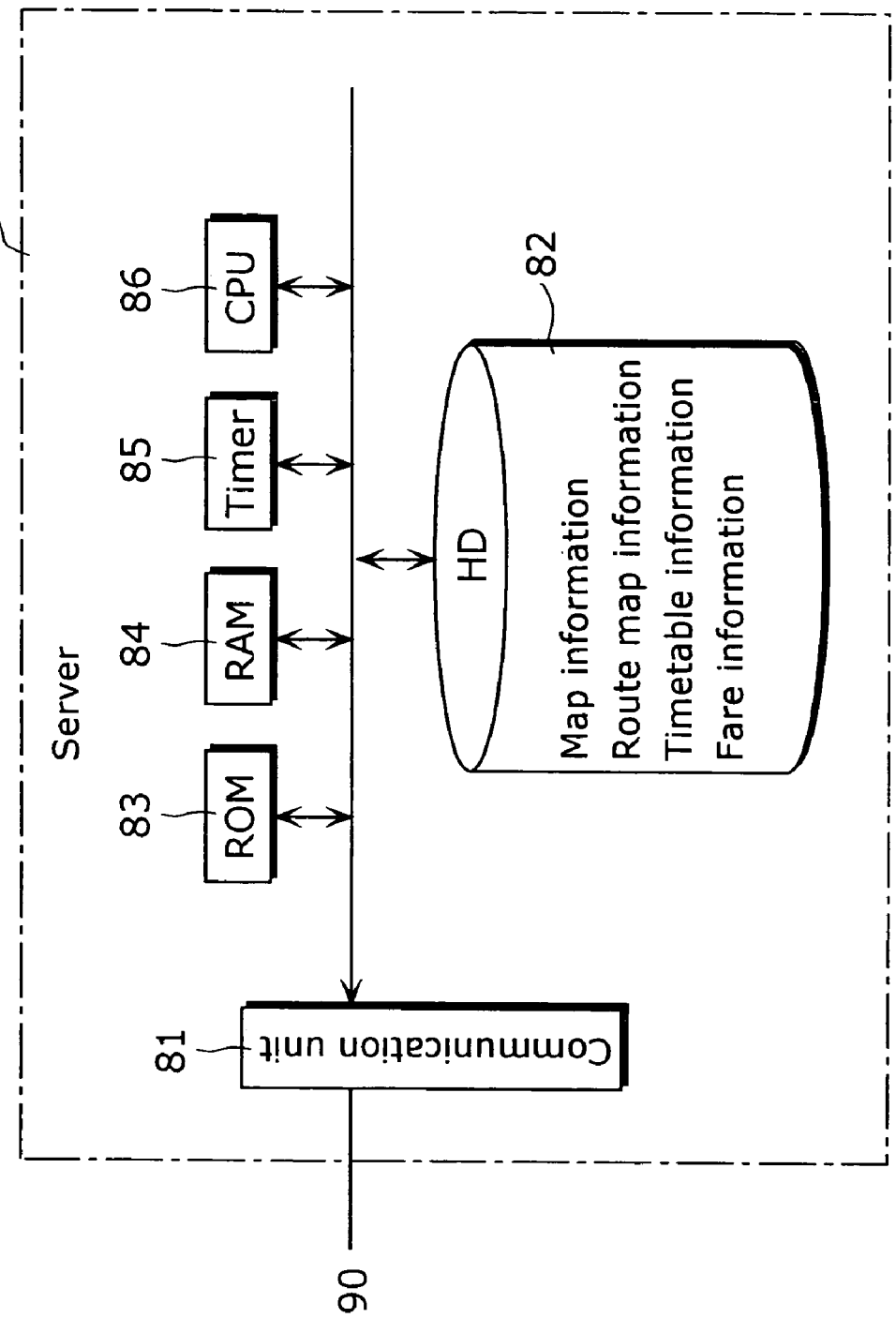
FIG. 22 shows a hardware configuration of the server 80 shown in FIG. 19.

FIG. 22 is a block diagram showing the hardware configuration of the server 80 shown in FIG. 19.

As shown in FIG. 22, the server 80 is composed of the following: a communication unit 81; a hardware disk 82 for storing beforehand map information, route map information for trains and buses, timetable information for trains and buses, and fare information for trains/buses/taxis; a ROM 83 for storing beforehand a program for searching a route; a RAM 84 for providing a work area during the operation of the program; a timer 85; and a CPU 86 for wholly controlling these units, and others. The CPU 86 of the server 80, having received the route information obtainment request from the cell phone 60, searches for various kinds of routes from the present position of the cell phone 60 to the user's home position by using the information stored in the hardware disk 82, and creates the route information including the route from the present position to the user's home position, reflecting the user's preferences, the required time for the returning route, and the departure time for leaving the present position in order to get home by the desired time. After the creation of the route information, the CPU 86 transmits the route information to the cell phone 60 via the communication unit 81.

It should be noted that the functional structures of the cell phone 60 and the server 80 are basically the same as the functional structure of the in-vehicle information apparatus 1 shown in FIG. 4. The big difference, however, is that the server 80 plays the roles of the map data holding unit 105, the route search unit 108 and the route search control unit 109. The user's preferences for the route selection and the information prepared by the server 80 are also different in view of the navigation performed by the cell phone 60.

The following describes a communication sequence of the route obtainment/presentation processing operated between the cell phone 60 and the server 80.

Figure 23:
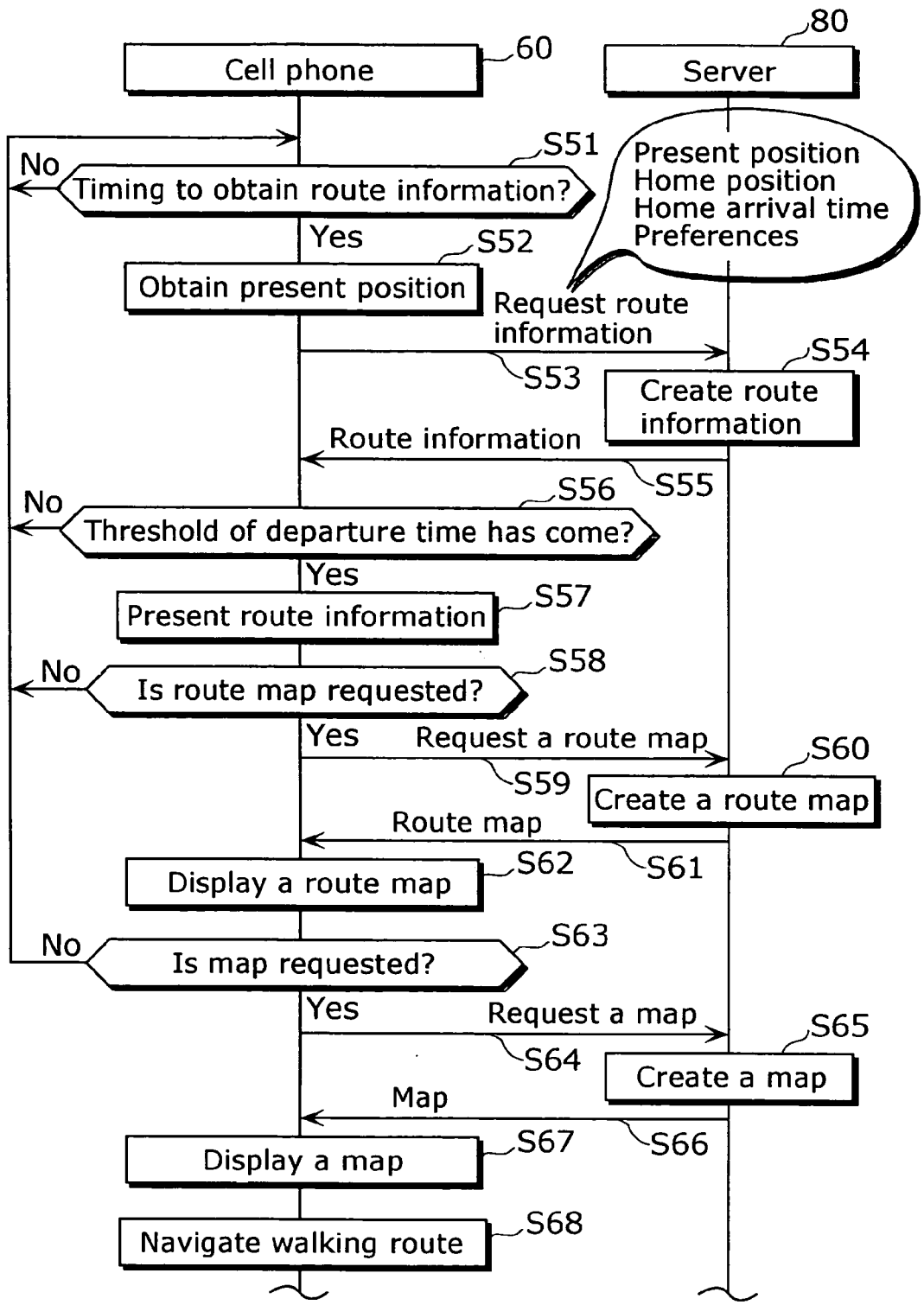
FIG. 23 shows a communication sequence of a route search/presentation processing operated between the cell phone 60 and the server 80.

FIG. 23 is a diagram showing the communication sequence of the route obtainment/presentation processing operated between the cell phone 60 and the server 80.

The CPU 190 of the cell phone 60 judges whether it is a timing to obtain the route information (S51). The timing for the route information obtainment can be determined as when the user operates the operation unit 115 or at least one of the following dynamic timings is triggered during the simulation: "at intervals of a predetermined period of time"; "at intervals of a predetermined amount of distance"; and "when the user drives off the guide route" is applied during the drive. When a traffic regulation takes place, a detour may be automatically searched for changing the route.

When the timing to obtain the route information comes, the CPU 190 obtains a present position from the GPS apparatus 140 (S52), generates a request for the route information including the obtained present position, as well as the user's home position, the home arrival time and the route selection preferences, which are already stored in the memory 180b, and transmits the generated route information request to the server 80 (S53).

The CPU 86 of the server 80, having received the route information request, refers to the hardware disk 82 and creates route information, based on the present position of the cell phone 60, the user's home position, the home arrival time and the route selection preferences, which are included in the route information request (S54).

The creation of the route information is operated as follows. For example, a case in which Momo has a party at Chikutaku-Tei in Nishinakajima, the CPU 86 of the server 80 searches for a station that is nearest to the present position where "Chikutaku-Tei" is located and obtains the names of the stations for departure, "Nishinakajima-Minamigata" for a subway and "Minamikata" for a Hankyu Line (train), located at the same distance away from the "Chikutaku-Tei". The CPU 86 then searches for stations for arrival, for both the subway and the Hankyu line, nearer to the user's home position and obtains the names of the station "Momoyamadai" for the subway and "Ninami-Senri" for the Hankyu line. The CPU 86 then calculates the time that is required for walking the distance from the present position to the station for departure as well as the distance from the station for arrival to the user's home position. The CPU 86 also obtains the departure times at the stations "Nishinakajima-Minamigata" and "Minamikata" and the arrival times at the stations "Momoyamadai" and the "Minami-Senri" from the timetable and calculates the required time. The CPU 86 calculates the departure time to leave the present position, "Chikutaku-Tei", by calculating it back based on the home arrival time and also obtains the fare "340 yen" between "Nishinakajima-Minamigata" and "Momoyamadai" as well as the fare "180 yen" between "Minamikata" and "Minami-Senri". It should be noted that, in the case of taking a taxi, the required time and the fare are obtained respectively based on the distance and fare information. The CPU 86 further extracts the returning route by which the user can get home by the desired time, refers to the user's preferences, and selects plural candidates in an order corresponding to the preferences from among the extracted returning routes so as to create the route information including a list of the candidates, departure times, fares, and other information for each of the candidates. The CPU 86 then transmits the created route information to the cell phone 60 (S55).

The CPU 190 of the cell phone 60, having received the route information, waits for the threshold of the departure time to come (S56) and presents a list of the candidates and the route information when the threshold of the departure time comes (S57). Here, the threshold of the departure time is set as 15 minutes before the departure time to leave the present position for the candidate that reflects the user's preferences the least, but the departure time may be set differently such as 10 minutes or may be set before the departure time for the candidate that reflects the user's preferences the most.

FIGS. 24A–24F show a screen to select a candidate as well as screens showing each of the candidates in detail to be displayed by the display 130 of the cell phone 60. FIG. 24A shows the screen to select a candidate while FIGS. 24B–24F show the detailed display screens of each of the candidates.

In the example shown in FIG. 24A, the departure time to leave the present position and the fare is listed for the candidates 1–5. When either candidate 1 or 2 is selected, the route reflecting the user's preferences, such as the departure time to leave the present position, the required time for the returning route, the home arrival time, and the fare, is displayed for the case of taking the subway (FIGS. 24B and 24C). When either of the candidates 3, 4 and 5 is selected, the route with modified preferences, such as the departure time to leave the present position, the required time for the returning route, the home arrival time, and the fare, is displayed for the case of taking the Hankyu line (FIGS. 24D–24F). Here, the case of taking a taxi as well as the case of walking from Minami-Senri to home are shown and the route is searched for, giving priority to "Avoid routes with dark places" than "Prioritize a total amount of fares" since there is a dark place on the way from Minami-Senri to home.

Thus, the user can know beforehand the time by which he/she has to leave, various kinds of returning routes, fares, and arriving times.

When one of the detailed screens is selected, the CPU 190 of the cell phone 60 judges whether or not a train map is requested (S58). When the train map is requested, the CPU 190 requests the server 80 to send the train map (S59).

When receiving the request for the train map, the CPU 86 of the server 80 creates the train map including the present position of the cell phone 60 and the user's home position (S60) and transmits the created train map to the cell phone 60 (S61).

Figure 25:
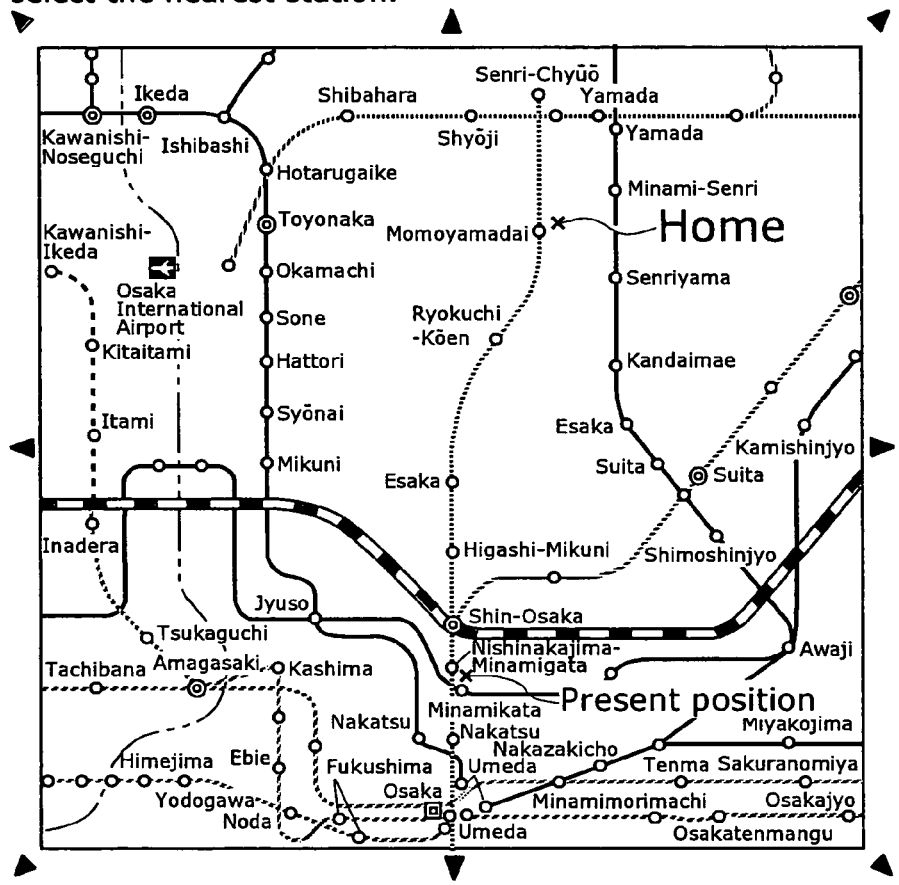
FIG. 25 shows an example of a route map.

When receiving the train map, the CPU 190 of the cell phone displays the received train map on the display 130 (S62). FIG. 25 shows an example of the route map. In the example shown in FIG. 25, the train map including the route from the present position to the user's home position is displayed together with the message "Please select the nearest station".

When the route map is displayed, the CPU 190 of the cell phone 60 judges whether or not the map of the nearest station is requested (S63). When the map is requested, the CPU 190 requests the server 80 for the map including the present position and the nearest station (S64).

When the map is requested, the CPU 86 of the server 80 creates the requested map (S65) and transmits the created map to the cell phone 60 (S66).

When receiving the map, the CPU 86 of the cell phone 60 displays the received map (S67). The cell phone 60 then navigates the walking route (S68).

Figure 26:
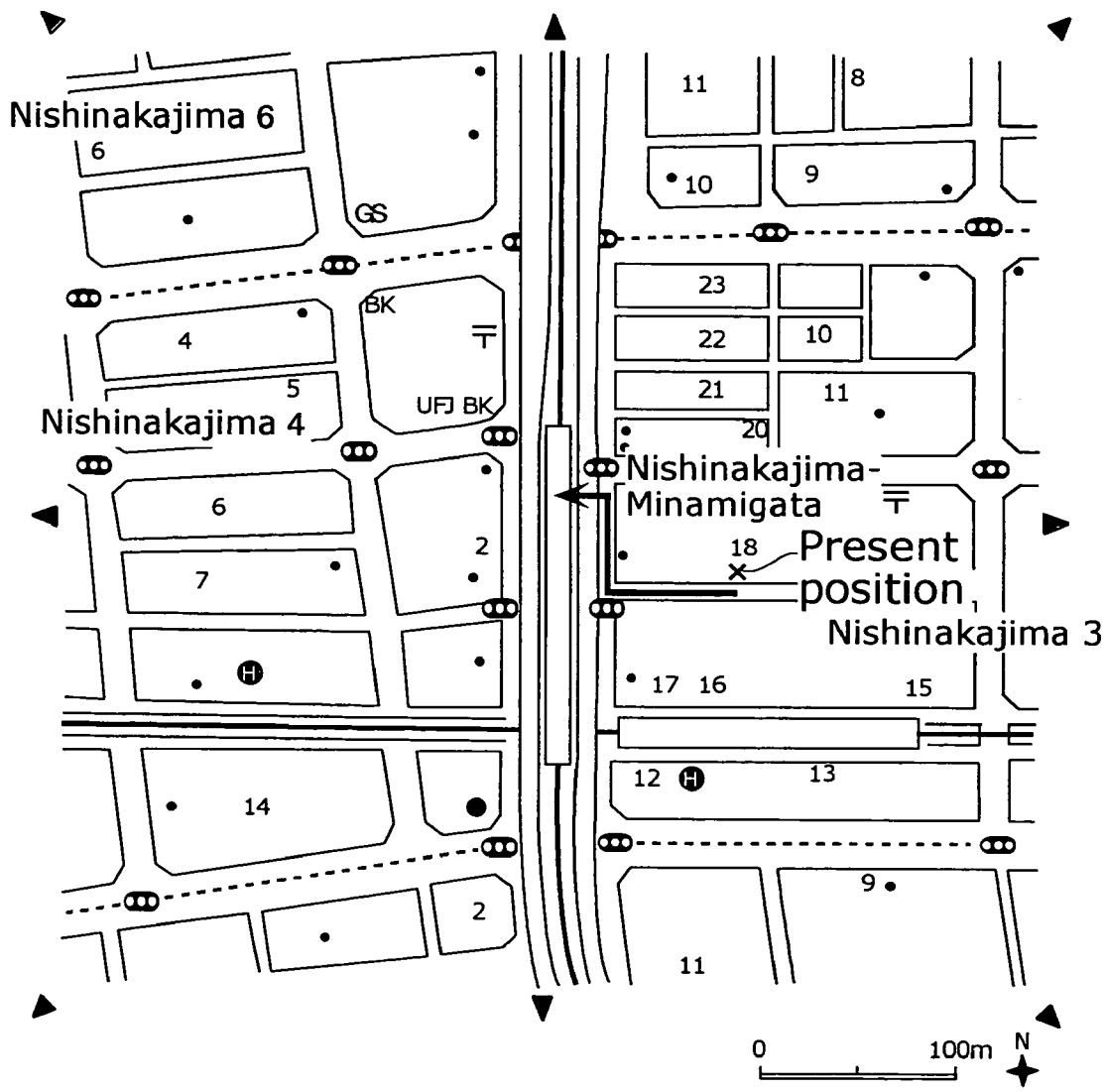
FIG. 26 shows an example of a map.

FIG. 26 shows an example of the map. In the example shown in FIG. 26, the map including the route from the present position to the subway station "Nishinakajima-Minamigata" and the walking route are displayed.

In this way, the user is informed of the route to take from the present position to the subway station "Nishinakajima-Minamigata" although the place is unfamiliar to the user.

It should be noted that in the second embodiment, the candidates are presented focusing on the case of taking a train. The route information may be presented so that the departure time to leave the present position is presented for the respective cases of taking a train, a bus, a taxi, and walking.

In the case of taking a train, "whether or not to use women-only compartment" may be added as one of the preferences.

In the second embodiment, the cell phone 60 requests the route information including a present position, a user's home position, a home arrival time as well as the user's preferences. The cell phone 60, however, may request the route information including only a present position and a user's home position or only a present position, a user's home position and a home arrival time so as to search a route based on the route maps, maps, and fares transmitted from the server 80.

Furthermore, the storage medium ex207 may store the maps, bus/train maps, timetables, and fare information only for the vicinity of the user's home position so that the cell phone 60 can search for a route without accessing to the server 80, based on the information stored in the storage medium ex207.

INDUSTRIAL APPLICABILITY

The information presentation apparatus according to the present invention can be used as a computer apparatus such as a system for car navigation, a cell phone, and others, and can be applied as an assistance to get home in presenting a departure time to leave a present position and a returning route.

What is claimed is:

1. An information presentation apparatus for presenting, to a user, information which includes a returning route, said apparatus comprising:
    a home position holding unit operable to hold in advance a position of the user's home;
    a home arrival time holding unit operable to hold in advance a home arrival time of the user;
    a present position obtainment unit operable to obtain a present position of the user;
    a present time obtainment unit operable to obtain a present time;
    an obtainment unit operable to obtain a returning route from the present position to the user's home position, a required time for the returning route, and a departure time to leave the present position so that the user can get home by the home arrival time;
    a presentation unit operable to compare the departure time obtained by said obtainment unit and the present time, and present to the user the departure time and the returning route which are obtained by said obtainment unit, before the departure time is passed;
    a preference accumulation unit operable to accumulate in advance the user's preferences relating to a route selection; and
    a control unit operable to control a degree of reflecting the user's preferences relating to the route selection which are used by said obtainment unit;
    wherein said obtainment unit is operable to obtain the returning route which reflects the user's preferences relating to the route selection which are accumulated by said preference accumulation unit; and
    wherein said control unit is operable to
        compare the present time, the home arrival time, and the required time for the returning route obtained by said obtainment unit,
        judge whether or not the user can get home by the home arrival time by taking the returning route obtained by said obtainment unit, and
        request said obtainment unit to search for the route again based on modified preferences of the user relating to the route selection so as to shorten the required time, when judging that the user cannot get home by the home arrival time.

2. The information presentation apparatus according to claim 1, further comprising a map data holding unit operable to hold map data, wherein:
    said information presentation apparatus is placed in a vehicle the user drives;
    said obtainment unit is operable to obtain the returning route, the required time for the returning route, and the departure time based on the map data; and
    said presentation unit is operable to present the returning route to be taken by the user on a map.

3. The information presentation apparatus according to claim 2, further comprising an operation unit, wherein said obtainment unit is operable to search for the returning route when the user operates said operation unit.

4. The information presentation apparatus according to claim 2, wherein said obtainment unit is operable to search for the returning route in at least one of dynamic timings of: at intervals of a predetermined period of time; at intervals of a predetermined amount of distance; when the vehicle stops at a traffic light; when new Vehicle Information and Communication System information including new traffic information is obtained; and when the vehicle drives off the returning route.

5. The information presentation apparatus according to claim 2, wherein the user's preferences relating to the route selection which are accumulated by said preference accumulation unit include at least one of "Prioritize toll roads", "Prioritize large roads", and "Prioritize roads with few intersections".

6. The information presentation apparatus according to claim 2, further comprising a user specification unit operable to specify a user from among a plurality of users, wherein:
said home arrival time holding unit is operable to hold in advance a home arrival time for each of the plurality of users;
said preference accumulation unit is operable to hold in advance preferences relating to a route selection for each of the plurality of users; and
said obtainment unit is operable to obtain a returning route for the user among the plurality of users specified by said user specification unit which reflects the user's preferences relating to the route selection.

7. The information presentation apparatus according to claim 2, further comprising a user identification unit operable to identify a user of the vehicle from among a plurality of users, wherein:
said home arrival time holding unit is operable to hold in advance a home arrival time for each of the plurality of users;
said preference accumulation unit is operable to accumulate in advance preferences relating to a route selection for each of the plurality of users; and
said obtainment unit is operable to obtain a returning route for the user among the plurality of users specified by said user specification unit which reflects the user's preferences relating to the route selection.

8. The information presentation apparatus according to claim 1, wherein said presentation unit is operable to present to the user that the user's preferences relating to the route selection, which are already set by the user, are modified, in a case where said control unit has requested said obtainment unit to modify the preferences relating to the route selection so as to search for the returning route again.

9. The information presentation apparatus according to claim 1, wherein, in a case where said control unit has requested said obtainment unit to modify the user's preferences relating to the route selection so as to search for the route again, said control unit is operable to update the preferences relating to the route selection, which are accumulated by said preference accumulation unit, to the modified preferences.

10. The information presentation apparatus according to claim 1, wherein:
said information presentation apparatus is portable; and
said obtainment unit is operable to externally obtain the returning route, the required time for the returning route, and the departure time.

11. The information presentation apparatus according to claim 10, further comprising an operation unit, wherein said obtainment unit is operable to externally obtain the returning route, the required time for the returning route, and the departure time when the user operates said operation unit.

12. The information presentation apparatus according to claim 10, wherein said obtainment unit is operable to externally obtain, the returning route, the required time for taking the returning route, and the departure time in at least one of dynamic timings of: at intervals of a predetermined period of time; at intervals of a predetermined amount of distance; and when the user deviates from the returning route.

13. The information presentation apparatus according to claim 10, wherein the user's preferences relating to the route selection, which are accumulated by said preference accumulation unit, include at least one of "Order of priority in a means of transportation: train, bus, taxi and on foot", "Prioritize a total amount of fares" and "Order of priority for walking routes: avoiding dark places and taking the shortest route".

14. The information presentation apparatus according to claim 10, further comprising an operation unit, wherein:
said obtainment unit is operable to externally obtain map data including the returning route, when the user operates said operation unit; and
said presentation unit is operable to present the returning route on a map.

15. An information presentation method for presenting, to a user, information including a returning route, said method comprising:
holding in advance a position of the user's home;
holding in advance a home arrival time of the user;
obtaining a present position of the user;
obtaining a present time;
obtaining a returning route from the present position to the held user's home position, a required time for the returning route, and a departure time to leave the present position so that the user can get home by the held home arrival time;
comparing the obtained departure time the present time, and presenting to the user the obtained departure time and the obtained returning route, before the departure time is passed;
accumulating in advance the user's preferences relating to a route selection; and
controlling a degree of reflecting the user's preferences relating to the route selection which are used in said obtaining of the returning route, the required time and the departure time, and which are previously accumulated in said accumulating of the user's preferences;
wherein said obtaining of the returning route, the required time and the departure time obtains the retuning route which reflects the user's preferences relating to the route selection; and
wherein said controlling
compares the present time, the home arrival time, and the required time for the returning route obtained in said obtaining of the returning route, the required time and the departure time,
judges whether or not the user can get home by the home arrival time by taking the obtained returning route, and
when it is judged that the user cannot get home by the home arrival time, causes said obtaining of the returning route, the required time and the departure time to search for the returning route again based on modified preferences of the user relating to the route selection so as to shorten the required time.

16. A program for an information presentation method for presenting, to a user, information including a returning route, said program being stored on a computer-readable medium and causing a computer to execute:

holding in advance a position of the user's home;
holding in advance a home arrival time of the user;
obtaining a present position of the user;
obtaining a present time;
obtaining a returning route from the present position to the held user's home position, a required time for the returning route, and a departure time to leave the present position so that the user can get home by the held home arrival time;
comparing the obtained departure time and the present time, and presenting to the user the obtained departure time and the obtained returning route, before the departure time is passed
accumulating in advance the user's preferences relating to a route selection; and
controlling a degree of reflecting the user's preferences relating to the route selection which are used in said obtaining of the returning route the required time and the departure time, and which are previously accumulated in said accumulating of the user's preferences;

wherein said obtaining of the returning route, the required time and the departure time obtains the returning route which reflects the user's preferences relating to the route selection; and wherein said controlling
    compares the present time, the home arrival time, and the required time for the returning route obtained in said obtaining of the returning route, the required time and the departure time,
    judges whether or not the user can get home by the home arrival time by taking the obtained returning route, and
    when it is judged that the user cannot get home by the home arrival time, causes said obtaining of the returning route, the required time and the departure time to search for the returning route again based on modified preferences of the user relating to the route selection so as to shorten the required time.

* * * * *